(12) United States Patent
Kuroda

(10) Patent No.: US 11,157,215 B2
(45) Date of Patent: Oct. 26, 2021

(54) INFORMATION PROCESSING APPARATUS, IMAGE FORMING SYSTEM, INFORMATION PROCESSING METHOD, AND STORAGE MEDIUM

(71) Applicant: CANON KABUSHIKI KAISHA, Tokyo (JP)

(72) Inventor: Takashi Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/093,354

(22) Filed: Nov. 9, 2020

(65) Prior Publication Data

US 2021/0141572 A1 May 13, 2021

(30) Foreign Application Priority Data

Nov. 13, 2019 (JP) .............................. JP2019-205677

(51) Int. Cl.
  *G06F 15/00* (2006.01)
  *G06F 3/12* (2006.01)
  *G06K 1/00* (2006.01)

(52) U.S. Cl.
  CPC .......... *G06F 3/1204* (2013.01); *G06F 3/1259* (2013.01)

(58) Field of Classification Search
  CPC .... G06F 3/1204; G06F 3/1259; G06F 3/1296; G06F 3/1297; G06F 3/1293; G06K 15/00; H04N 1/00204

USPC ................................ 358/1.15, 1.14, 1.13, 1.1
  See application file for complete search history.

(56) References Cited

U.S. PATENT DOCUMENTS

| | | | |
|---|---|---|---|
| 2012/0093550 A1* | 4/2012 | Takemura | G03G 15/2039 399/329 |
| 2014/0354719 A1* | 12/2014 | Yamagata | B41J 2/17566 347/7 |
| 2020/0347252 A1* | 11/2020 | Sasada | C09D 11/102 |

FOREIGN PATENT DOCUMENTS

JP 2010042521 A 2/2010

* cited by examiner

*Primary Examiner* — Douglas Q Tran
(74) *Attorney, Agent, or Firm* — Canon U.S.A., Inc. I.P. Division

(57) ABSTRACT

An information processing apparatus includes an obtaining unit and a control unit. The obtaining unit obtains, from a verification apparatus configured to perform, for each printed material of printed materials, verification about whether the printed material satisfies a given condition, information that is based on a result of the verification. Each of the printed materials is a recording medium on which an image is printed by a printing apparatus. The control unit performs control so that output of the printed materials from the printing apparatus is suppressed when a given number of printed materials are handled as one bundle and the number of printed materials that satisfy the given condition reaches the given number based on the verification result. The control unit performs control so that insertion paper interspacing a plurality of bundles is output next to the given number of printed materials that satisfy the given condition.

15 Claims, 23 Drawing Sheets

FIG. 6A

CORRECT IMAGE REGISTRATION

INVOICE

| XXXXXXX | XXXXXXX | XXXXXXX |
|---|---|---|
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |

~601

READING IS NOW COMPLETE. REGISTER THIS IMAGE AS CORRECT IMAGE?

[SET VERIFICATION SKIP AREA] ~604

[REGISTER] ~605

[CANCEL] ~606

◁ SHEET 1 OF 1 SHEET ▷   FRONT ⟳ ~603

VERIFICATION SKIP AREA SETTINGS

INVOICE

| XXXXXXX | XXXXXXX | XXXXXXX |
|---|---|---|
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | | |
| XXXXXXX | VERIFICATION SKIP AREA | |
| XXXXXXX | | |
| XXXXXXX | | |
| XXXXXXX | | |
| XXXXXXX | XXXXXXX | XXXXXXX |

~611
~601

612 POSITION    613 AREA SIZE

△    △
◁ ▷  ◁ ▷
▽    ▽

[REGISTER] ~614

[ADDITIONALLY REGISTER ANOTHER VERIFICATION SKIP AREA] ~615

[CANCEL] ~616

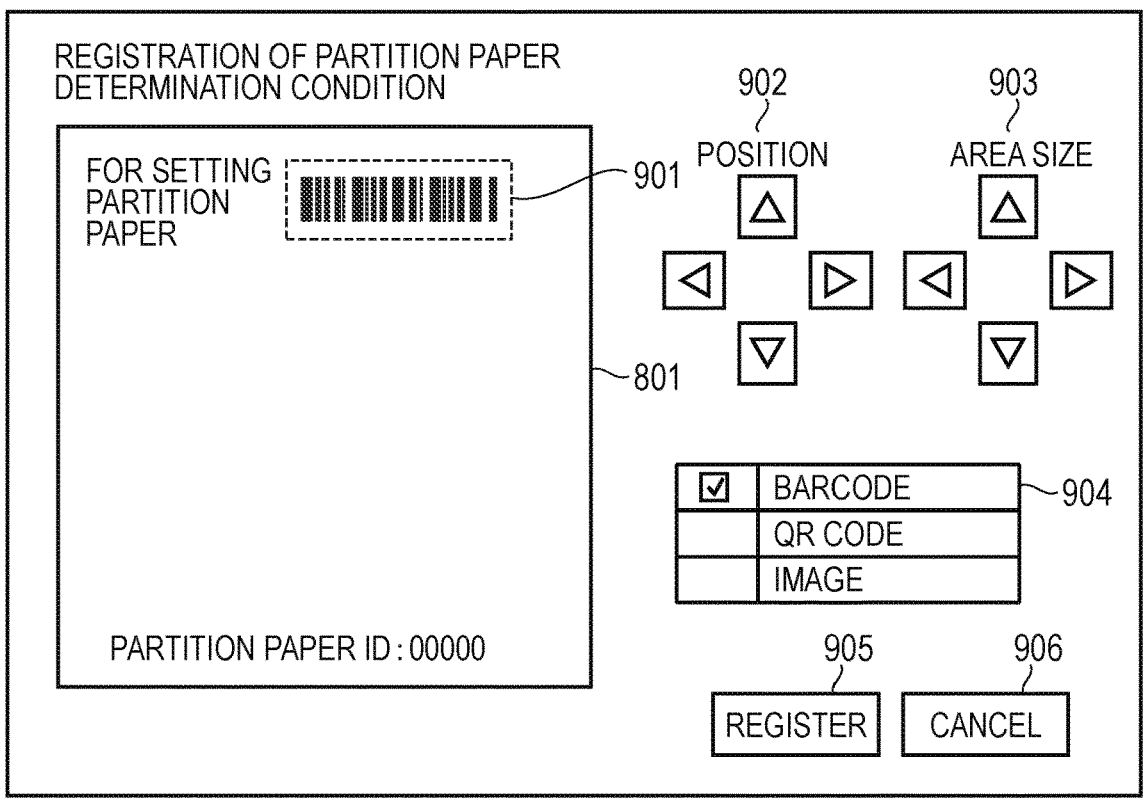
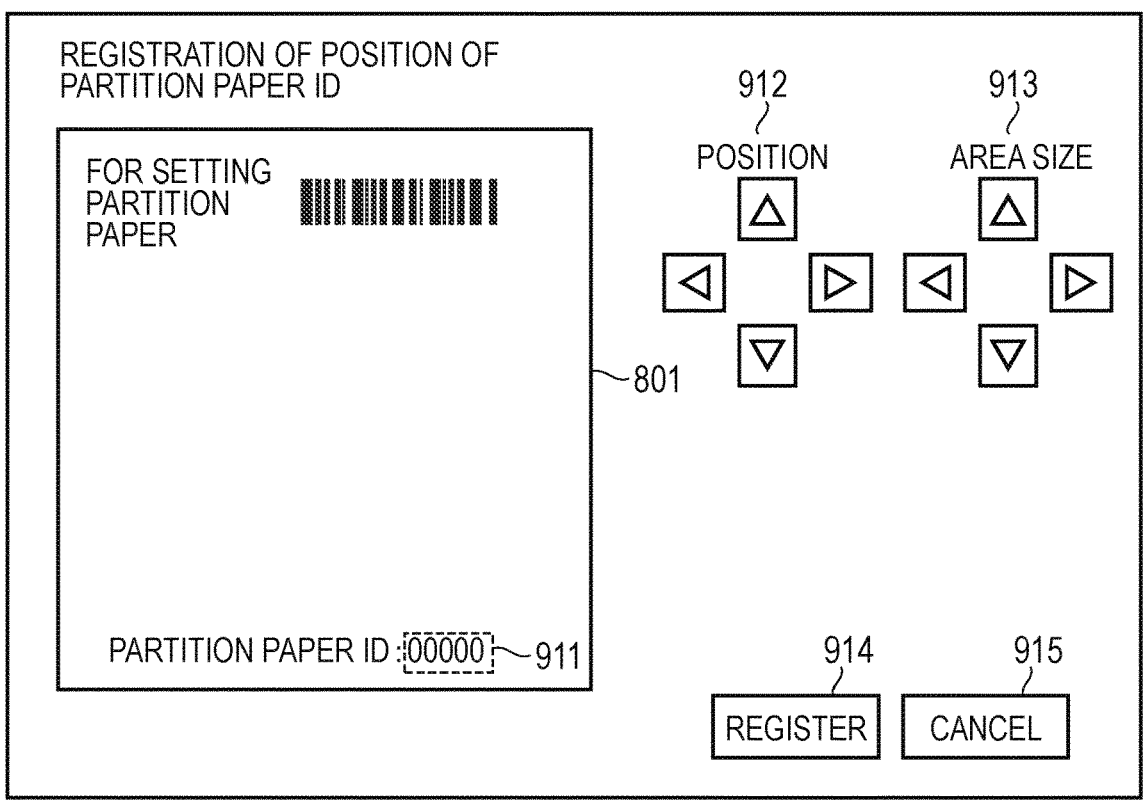

FIG. 11

| VERIFICATION RESULTS | 1101 |
|---|---|
| TIME | 3/6 10:10 |
| JOB NAME | INVOICE |
| NUMBER OF VERIFIED SHEETS | 1,000 SHEETS |
| NUMBER OF SHEETS PASSING VERIFICATION | 986 SHEETS |
| NUMBER OF SHEETS FAILING VERIFICATION | 14 SHEETS |
| NUMBER OF SHEETS OF PARTITION PAPER | 20 SHEETS |

PARTITION PAPER-BY-PARTITION PAPER VERIFICATION RESULTS 1102

| PARTITION PAPER ID | PASSED SHEETS | FAILED SHEETS |
|---|---|---|
| 10001 | 49 SHEETS | 1 SHEET |
| 10002 | 48 SHEETS | 2 SHEETS |
| 10003 | 50 SHEETS | 0 SHEETS |
| 10004 | 49 SHEETS | 1 SHEET |
| 10005 | 50 SHEETS | 0 SHEETS |
| 10006 | 50 SHEETS | 0 SHEETS |
| 10007 | 48 SHEETS | 2 SHEETS |

PRECEDING JOB ◁  NEXT JOB ▷

JOB 1 OF 9 JOBS
1103

OK ~1104

INFORMATION PROCESSING APPARATUS, IMAGE FORMING SYSTEM, INFORMATION PROCESSING METHOD, AND STORAGE MEDIUM

BACKGROUND

Field

The present disclosure relates to an information processing apparatus, an image forming system, an information processing method, and a storage medium.

Description of the Related Art

There has been known a printing system in which a printed material that is paper or a similar recording medium (hereinafter also referred to as "sheet") having an image printed thereon by a printing apparatus can be verified by a verification apparatus during conveyance of the printed material. In verification of a sheet (for example, printed material), the verification apparatus reads an image of the sheet conveyed thereto, and performs image analysis on the read image, to thereby determine whether the sheet is normal based on a result of the image analysis. The verification apparatus detects, for example, a broken bar in a barcode, a broken ruled line, missing of an image, a printing defect, a skipped page, and bleeding of a color. When the conveyed sheet is thus determined to be a defective sheet, the defective sheet is discharged to a sheet discharge destination different from a sheet discharge destination for normal sheets. This mechanism prevents a situation in which a defective sheet is mixed in a bundle of normal sheets. In Japanese Patent Application Laid-Open No. 2010-42521, for example, there is disclosed an example of the printing system in which a sheet can be verified by the verification apparatus.

Some printing systems have a function of inserting insertion paper (hereinafter also referred to as "partition paper") for separating one bundle from another bundle between the bundles, each of which contains a specified number of sheets. This function is used when, for example, sheets of postage stamps or other printed materials are shipped in bundles each containing a fixed number of sheets.

Generally speaking, there are a plurality of steps of image forming by the printing apparatus, and it tends to take some time before an image is formed on a sheet and the sheet is conveyed to the verification apparatus. Some printing systems accordingly process the steps of image forming in parallel by sending a plurality of sheets down a conveyance path improving overall productivity of printing processing. When partition paper is to be inserted for every specific number of sheets in this type of printing system, the partition paper is inserted between sheets by, for example, instructing to immediately start conveying the partition paper each time the number of sheets for which printing has been instructed reaches the specific number. In this setup, when, for example, a sheet that is being conveyed is determined to be defective by the verification apparatus and is discharged to a conveyance destination different from the conveyance destination for normal sheets, the number of sheets included in a bundle falls short of the specific number by the number of defective sheets. In this case, a user (an operator), for example, supplements the bundle with as many separately prepared normal sheets as the number of defective sheets to create a bundle containing the specific number of normal sheets, which may be an additional difficulty to the user.

SUMMARY

According to an aspect of the present disclosure, an information processing apparatus includes an obtaining unit configured to obtain, from a verification apparatus configured to perform, for each printed material of printed materials, verification about whether the printed material satisfies a given condition, information that is based on a result of the verification, wherein each of the printed materials is a recording medium on which an image is printed by a printing apparatus, and a control unit configured to perform control so that output of the printed materials from the printing apparatus is suppressed when a given number of printed materials are handled as one bundle and the number of printed materials that satisfy the given condition reaches the given number based on the verification result, and so that insertion paper interspacing a plurality of bundles is output next to the given number of printed materials that satisfy the given condition.

Further features of the present disclosure will become apparent from the following description of exemplary embodiments with reference to the attached drawings.

BRIEF DESCRIPTION OF THE DRAWINGS

FIG. 6A is an example of a screen for receiving specification related to registration of a correct image from the user.

FIG. 6B is an example of a screen for receiving specification related to setting of a verification skip area to a correct image from the user.

FIG. 9A is an example of a screen for receiving an instruction about registration of a condition for determining partition paper from the user.

FIG. 9B is an example of a screen for receiving an instruction about registration of a position of a partition paper ID from the user.

FIG. 11 is an example of a verification result checking screen.

DESCRIPTION OF THE EMBODIMENTS

Figure 1:
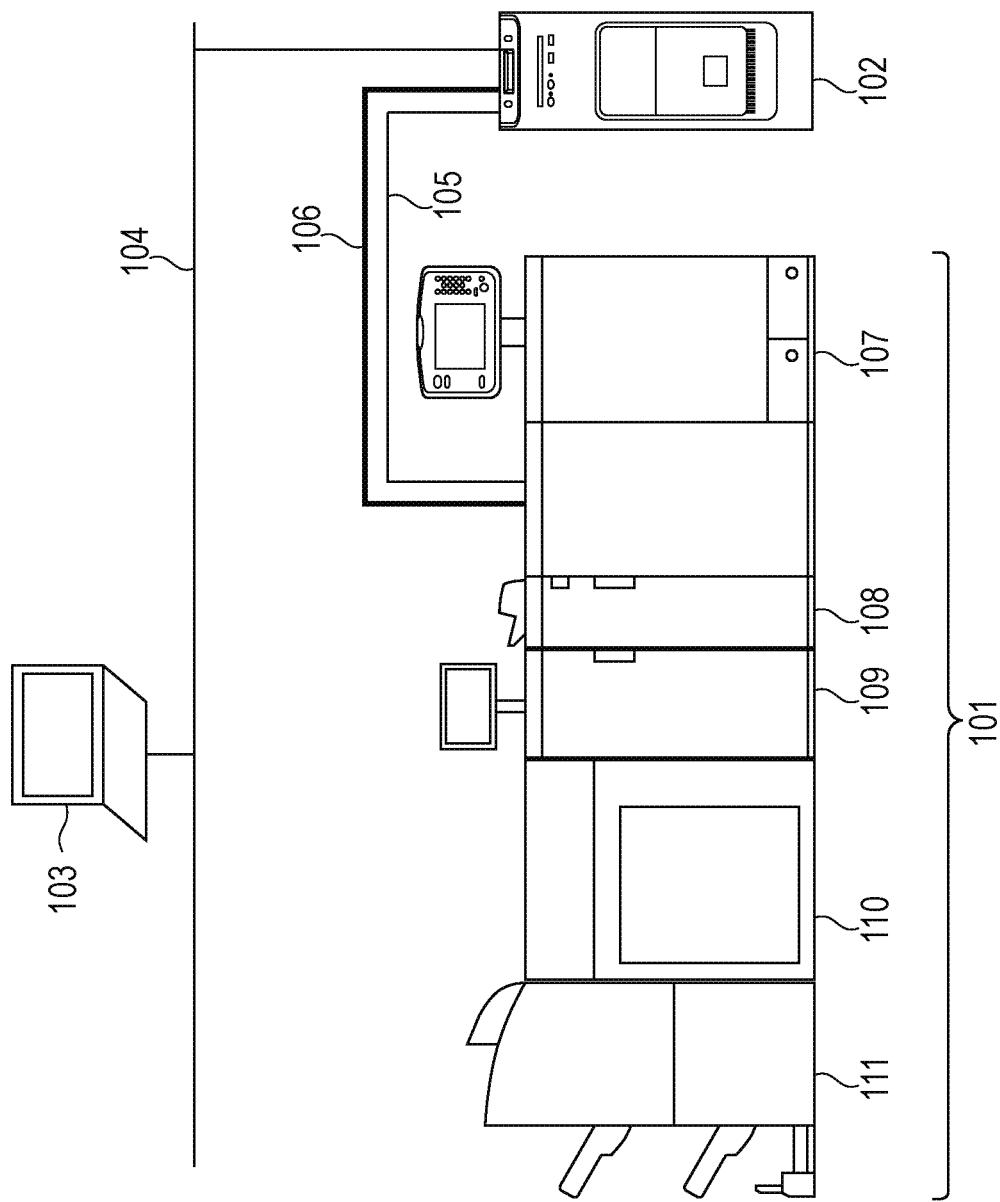
FIG. 1 is a diagram for illustrating a system configuration of an image forming system.

An exemplary embodiment of the present disclosure is described in detail below with reference to the accompanying drawings. Herein and in the drawings, components having substantially the same function configuration are denoted by the same reference symbol, and a duplicate description is thus omitted.

<System Configuration>

An example of a system configuration of an image forming system according to this embodiment is described with reference to FIG. 1. The image forming system includes an image forming apparatus 101 and an external controller 102. The image forming apparatus 101 and the external controller 102 are connected via an internal local area network (LAN) 105 and a video cable 106 in a manner that allows communication to and from each other. The external controller 102 is connected via an external LAN 104 to a terminal apparatus 103 in a manner that allows communication to and from the terminal apparatus 103, and various instructions including a print instruction are transmitted from the terminal apparatus 103 to the external controller 102.

The terminal apparatus 103 may be implemented by an information processing apparatus, for example, a personal computer (PC). The terminal apparatus 103 is installed with a printer driver having a function of converting print data into a print description language processible by the external controller 102. This allows a user to issue a print instruction via the printer driver from various applications running on the terminal apparatus 103. The printer driver receives the print instruction from the user (or from an application instructed by the user), and transmits print data to the external controller 102 based on the print instruction. The external controller 102 receives the print data from the terminal apparatus 103, executes data analysis, rasterization, and other types of processing, transmits image data created by the processing to the image forming apparatus 101, and then issues a print instruction to the image forming apparatus 101.

The image forming apparatus 101 receives the print instruction from the external controller 102, prints, based on the print data transmitted from the external controller 102, an image corresponding to the print data on a recording medium that is paper or the like, and outputs a printed material in which the image is printed on the recording medium. In this embodiment, paper is used as a recording medium.

The image forming apparatus 101 is described next. The image forming apparatus 101 may be configured by connecting a plurality of apparatus having different functions to one another, to thereby allow the image forming apparatus 101 to execute binding and other types of complicate printing processing. For instance, in the example illustrated in FIG. 1, the image forming apparatus 101 is configured by connecting a printing apparatus 107, an inserter 108, a verification apparatus 109, a stacker 110, and a finisher 111.

The printing apparatus 107 is configured to form an image with the use of a toner on a sheet conveyed from a sheet feeding unit. The sheet feeding unit is provided in, for example, a lower part of the printing apparatus 107. A configuration and an operation principle by which the printing apparatus 107 forms an image on a sheet with the use of a toner are now described.

The printing apparatus 107 modulates a beam of laser light or other types of light emitted from a light source in accordance with image data, then turns the modulated beam of light into scanning light by reflecting the modulated beam of light by a rotary polygon mirror, which is a polygon mirror or the like, and irradiates a photosensitive drum with the scanning light. An electrostatic latent image is thus formed on the photosensitive drum. The electrostatic latent image formed on the photosensitive drum with the beam of light is developed with a toner, and the resultant toner image is transferred to a sheet stuck to a transfer drum. This series of steps of image forming process is sequentially executed for each toner of a color used in image forming. In this embodiment, toners of colors used in image forming are a yellow (Y) toner, a magenta (M) toner, a cyan (C) toner, and a black (K) toner, and a full-color image is formed on the sheet with those toners through the image forming process described above.

The printing apparatus 107 conveys the sheet on the transfer drum on which the full-color image has been formed to a fixing device. The fixing device includes a roller, a belt, and others, and has a halogen heater or a similar heat source that is built in the roller to fix the full-color image to the sheet by melting, with heat and pressure, the toners on the sheet to which the toner images have been transferred.

The inserter 108 is configured to be capable of inserting another sheet to any place among a group of sheets that are printed materials conveyed to the inserter 108 with images printed on sheets by the printing apparatus 107.

The verification apparatus 109 is configured to determine whether an image that is printed on a sheet (for example, printed material) conveyed thereto is normal by reading the printed image and comparing the printed image to a correct image, which is registered in advance.

The stacker 110 is configured so that a number of sheets of paper or other types of sheets that are equal to or less than its capacity can be stacked. A stacker having a relatively large capacity is adopted by the image forming apparatus 101 of this embodiment.

The finisher 111 is configured to perform finishing processing on a sheet of paper or other types of sheets conveyed thereto. Examples of the finishing processing include stapling, punching, and saddle stitch binding. The finisher 111 is configured to deliver the sheet on which the finishing processing has been performed to a delivery tray.

The system configuration illustrated in FIG. 1 is just an example, and is not to limit the system configuration of the image forming system according to this embodiment. As a specific example, the image forming system may have a configuration in which the image forming apparatus 101 is connected to the external LAN 104 so that print data processible by the image forming apparatus 101 can be transmitted from the terminal apparatus 103 to the image forming apparatus 101. In this case, the image forming apparatus 101 may execute data analysis, rasterization, and other types of processing executed by the external controller 102.

The types of networks to connect the image forming apparatus 101, the external controller 102, and the terminal apparatus 103 to one another are not particularly limited as long as various types of information and data (for example, a print instruction and print data) can be transmitted and received among those apparatus. As a specific example, the networks described above are not limited to LANs, and may be the Internet, a dedicated line, a wide area network (WAN), or the like. The networks described above may also be wired networks or wireless networks. The networks described above may each include a plurality of networks, and some of the networks may be of a type different from the type of the other networks. Physical configurations of the networks described above are not particularly limited as long as communication among the apparatus described above is logically established. To give a specific example, communication between at least two apparatus out of the apparatus described above may be relayed by another apparatus, which is a communication apparatus or the like.

<Hardware Configuration>

Figure 2:
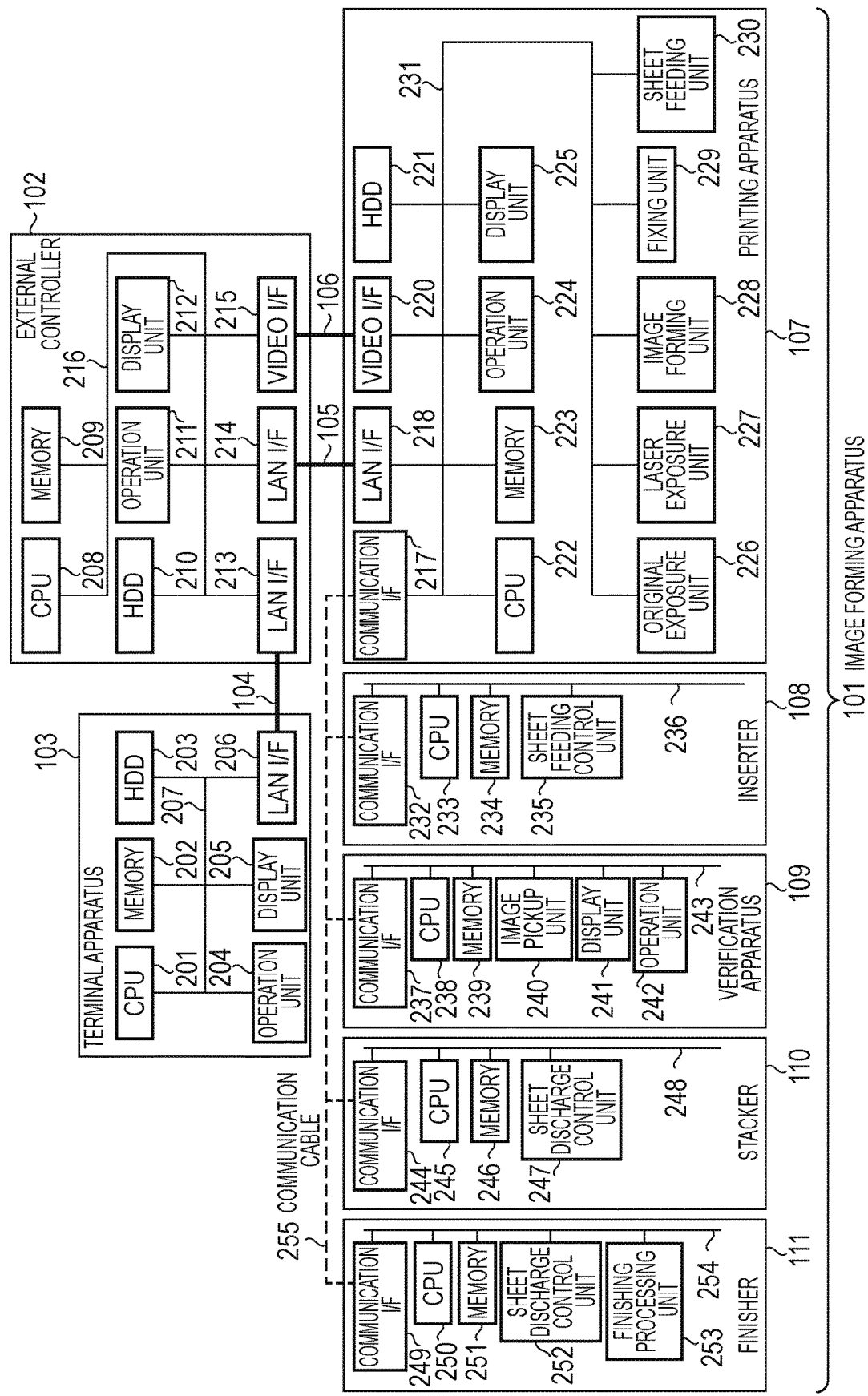
FIG. 2 is a diagram for illustrating a hardware configuration of apparatus included in the image forming system.

An example of hardware configurations of the apparatus included in the image forming apparatus 101 and of hardware configurations of the external controller 102 and the terminal apparatus 103 is described with reference to FIG. 2. The image forming apparatus 101 is configured by, as illustrated in FIG. 1, connecting the printing apparatus 107, the inserter 108, the verification apparatus 109, the stacker 110, and the finisher 111.

(Printing Apparatus 107)

A hardware configuration of the printing apparatus 107 is described. The printing apparatus 107 includes a communication I/F 217, a LAN I/F 218, a video I/F 220, a hard disk drive (HDD) 221, a CPU 222, a memory 223, an operation unit 224, and a display unit 225. The printing apparatus 107 also includes an original exposure unit 226, a laser exposure unit 227, an image forming unit 228, a fixing portion 229, and a sheet feeding unit 230. Those components included in the printing apparatus 107 are connected to one another via a system bus 231.

The communication I/F 217 is a communication interface for connecting the printing apparatus 107 via a communication cable 255 to other apparatus included in the image forming apparatus 101, for example, the inserter 108, the verification apparatus 109, the stacker 110, and the finisher 111. This allows the printing apparatus 107 to hold communication for controlling the other apparatus included in the image forming apparatus 101 to and from the other apparatus.

The LAN I/F 218 is a communication interface for connecting the printing apparatus 107 via the internal LAN 105 to the external controller 102. This allows the printing apparatus 107 to hold communication related to transmission of a print instruction, print data, and the like to and from the external controller 102.

The video I/F 220 is a communication interface for connecting the printing apparatus 107 via the video cable 106 to the external controller 102. This allows the printing apparatus 107 to hold communication related to transmission of image data and the like to and from the external controller 102.

The HDD 221 is a storage device configured to store various programs and various types of data.

The CPU 222 is configured to comprehensively perform control related to image processing and control related to printing by deploying a program that is stored in the HDD 221 onto the memory 223 and executing the program.

The memory 223 is used as a work area onto which programs corresponding to various types of processing to be executed by the CPU 222 are deployed, and in which image data is temporarily stored.

The operation unit 224 is configured to receive input of various settings and operation instructions from the user.

The display unit 225 is configured to present various types of information to the user by displaying the information. The display unit 225 may be implemented by, for example, a display or a similar output apparatus. The display unit 225 is configured to display, for example, settings information of the image forming apparatus 101 and information about, among others, the processing status of a print job.

The original exposure unit 226 is configured to execute processing related to the reading of an original when a copy function or a scanning function is used. As a specific example, the original exposure unit 226 reads original data by irradiating a sheet placed in an area to be read with light from an exposure lamp, and picking up an image of the irradiated sheet with an image pickup unit, which is a charge-coupled device (CCD) camera or the like.

The laser exposure unit 227 is a device for executing primary charging and laser exposure for irradiating the photosensitive drum with laser light in order to transfer a toner image. The laser exposure unit 227 first executes primary charging, in which a surface of the photosensitive drum is charged to a uniform negative potential. The laser exposure unit 227 next uses a laser driver to irradiate the photosensitive drum with laser light with a reflection angle adjusted by the polygon mirror. This neutralizes negative charges in a portion irradiated with the laser light, to thereby form an electrostatic latent image on the photosensitive drum.

The image forming unit 228 is a device for transferring a toner to a sheet, and includes a developing unit, a transfer unit, a toner replenishment unit, and others to transfer a toner on the photosensitive drum to a sheet. The developing unit is configured to cause a negatively charged toner to adhere from a developing cylinder to an electrostatic latent image on a surface of the photosensitive drum, and thus turn the electrostatic latent image into a visible image. The transfer unit is configured to execute primary transfer, in which a positive potential is applied to a primary transfer roller to transfer a toner on the surface of the photosensitive drum to a transfer belt, and secondary transfer, in which a positive potential is applied to a secondary transfer outer roller to transfer the toner on the transfer belt to a sheet.

The fixing portion 229 is a device for fixing a toner on a sheet to the sheet by melting the toner with heat and pressure, and includes a heater, a fixing belt, a pressure belt, and others.

The sheet feeding unit 230 is a device for feeding a sheet, and sheet feeding operation and sheet conveying operation of the sheet feeding unit 230 are controlled with rollers, various sensors, and the like.

(Inserter 108)

A hardware configuration of the inserter 108 is described. The inserter 108 includes a communication I/F 232, a CPU 233, a memory 234, and a sheet feeding control unit 235. Those components of the inserter 108 are connected to one another via a system bus 236.

The communication I/F 232 is a communication interface for connecting the inserter 108 to the printing apparatus 107 via the communication cable 255. This allows the inserter 108 to hold communication for control of the inserter 108 and the printing apparatus 107 to and from the printing apparatus 107.

The CPU 233 is configured to perform various types of control related to sheet feeding as programmed by a control program stored in the memory 234.

The memory 234 is a storage device storing the control program.

The sheet feeding control unit 235 is configured to control the feeding and conveyance of a sheet conveyed from a sheet feeding unit of the inserter 108 or from the printing apparatus 107 through control of a roller and a sensor based on an instruction from the CPU 233.

(Verification Apparatus 109)

A hardware configuration of the verification apparatus 109 is described. The verification apparatus 109 includes a communication OF 237, a CPU 238, a memory 239, an image pickup unit 240, a display unit 241, and an operation unit 242. Those components of the verification apparatus 109 are connected to one another via a system bus 243.

The communication I/F 237 is a communication interface for connecting the verification apparatus 109 via the communication cable 255 to the printing apparatus 107. This allows the verification apparatus 109 to hold communication for control of the verification apparatus 109 and the printing apparatus 107 to and from the printing apparatus 107.

The CPU 238 is configured to perform various types of control related to verification of a printed material as programmed by a control program stored in the memory 239.

The memory 239 is a storage device storing the control program.

The image pickup unit 240 is configured to pick up an image of a conveyed sheet based on an instruction of the CPU 238.

The CPU 238 is configured to compare the image picked up by the image pickup unit 240 and a correct image stored in the memory 239 to determine whether the printed image fulfils a given condition, and thereby determine whether the printed image is normal.

The display unit 241 is configured to display various types of information, to thereby present the information to the user. The display unit 241 displays, for example, a verification result and a setting screen.

The operation unit 242 is configured to receive input of various settings and operation instructions from the user. The operation unit 242 receives, for example, an instruction about a change to the settings of the verification apparatus 109, and an instruction about registration of a correct image.

(Stacker 110)

A hardware configuration of the stacker 110 is described. The stacker 110 includes a communication I/F 244, a CPU 245, a memory 246, and a sheet discharge control unit 247. Those components of the stacker 110 are connected to one another via a system bus 248.

The communication I/F 244 is a communication interface for connecting the stacker 110 to the printing apparatus 107 via the communication cable 255. This allows the stacker 110 to hold communication for control of the stacker 110 and the printing apparatus 107 to and from the printing apparatus 107.

The CPU 245 is configured to perform various types of control related to sheet discharge as programmed by a control program stored in the memory 246.

The memory 246 is a storage device storing the control program.

The sheet discharge control unit 247 is configured to perform control to convey a conveyed sheet to a sheet stacking tray or an escape tray, or to the finisher 111 in the downstream, based on an instruction from the CPU 245.

(Finisher 111)

A hardware configuration of the finisher 111 is described. The finisher 111 includes a communication I/F 249, a CPU 250, a memory 251, a sheet discharge control unit 252, and a finishing processing unit 253. Those components of the finisher 111 are connected to one another via a system bus 254.

The communication I/F 249 is a communication interface for connecting the finisher 111 to the printing apparatus 107 via the communication cable 255. This allows the finisher 111 to hold communication for control of the finisher 111 and the printing apparatus 107 to and from the printing apparatus 107.

The CPU 250 is configured to perform various types of control related to finishing and sheet discharge as programmed by a control program stored in the memory 251.

The memory 251 is a storage device storing the control program.

The finishing processing unit 253 is configured to execute stapling, punching, saddle stitch binding, and other types of finishing processing based on an instruction from the CPU 250.

(External Controller 102)

A hardware configuration of the external controller 102 is described. The external controller 102 includes a CPU 208, a memory 209, an HDD 210, an operation unit 211, a display unit 212, a LAN I/F 213, a LAN I/F 214, and a video I/F 215. Those components of the external controller 102 are connected to one another via a system bus 216.

The HDD 210 is a storage device configured to store various programs and various types of data. The HDD 210 stores, for example, programs and data related to printing processing and other types of operation.

The CPU 208 is configured to comprehensively execute processing related to, for example, reception of print data from the terminal apparatus 103, RIP processing, and transmission of print data to the image forming apparatus 101, based on a program and data that are stored in the HDD 210.

The memory 209 is used as a work area onto which programs corresponding to various types of processing to be executed by the CPU 208 are deployed, and in which data is temporarily stored.

The operation unit 211 is configured to receive various instructions related to operation of the external controller 102 from the user. The operation unit 211 may be implemented by, for example, a keyboard, or a similar input device.

The display unit 212 is configured to display various types of information, to thereby present the information to the user. The display unit 212 may be implemented by, for example, a display or a similar output device. The display unit 212 displays, for example, information related to an application being executed in the external controller 102, or about others, with the use of a video signal of a still image or a moving image.

The LAN I/F 213 is a communication interface for connecting the external controller 102 to the terminal apparatus 103 via the external LAN 104. This allows the external controller 102 to hold communication related to transmission of a print instruction, print data, and the like to and from the terminal apparatus 103.

The LAN I/F 214 is a communication interface for connecting the external controller 102 to the image forming apparatus 101 via the internal LAN 105. This allows the external controller 102 to hold communication related to transmission of a print instruction and the like to and from the image forming apparatus 101.

The video I/F 215 is a communication interface for connecting the external controller 102 to the image forming apparatus 101 via the video cable 106. This allows the external control 102 to hold communication related to transmission of print data and the like to and from the image forming apparatus 101.

(Terminal Apparatus 103)

A hardware configuration of the terminal apparatus 103 is described. The terminal apparatus 103 includes a CPU 201, a memory 202, an HDD 203, an operation unit 204, a display unit 205, and a LAN I/F 206. Those components of the terminal apparatus 103 are connected to one another via a system bus 207.

The HDD 203 is a storage device configured to store various programs and various types of data. The HDD 203 stores, for example, programs and data related to printing processing and other types of operation.

The CPU 201 is configured to create print data and execute a print instruction directed to other apparatus (for example, the external controller 102 and the image forming apparatus 101), based on a program and data stored in the HDD 203. The CPU 201 is also configured to comprehensively control the operation of the components connected to the system bus 207.

The memory 202 is used as a work area onto which programs corresponding to various types of processing to be executed by the CPU 201 are deployed, and in which data is temporarily stored.

The operation unit 204 is configured to receive various instructions related to operation of the terminal apparatus 103 from the user. The operation unit 204 may be implemented by, for example, a keyboard or a similar input device.

The display unit 205 is configured to display various types of information, to thereby present the information to the user. The display unit 205 may be implemented by, for example, a display or a similar output device. The display unit 205 displays, for example, information related to an application being executed on the terminal apparatus 103, or about others, with the use of a video signal of a still image or a moving image.

The configurations described above are just an example, and are not to limit the hardware configurations of the apparatus included in the image forming apparatus 101 and the hardware configurations of the external controller 102 and the terminal apparatus 103.

For instance, the type of a network connecting the external controller 102 and the image forming apparatus 101 to each other is not particularly limited as long as various types of information and various types of data that are used in printing can be transmitted and received between the external controller 102 and the image forming apparatus 101. As a specific example, a video cable alone may be used to connect the external controller 102 and the image forming apparatus 101 to each other. In this case, transmission via the video cable is used for a print instruction from the external controller 102 to the image forming apparatus 101 as well.

The memories 202, 209, 223, 234, 239, 246, and 251 may each be any storage device capable of holding data, a program, and the like. As a specific example, those memories may each be implemented by a volatile random access memory (RAM), a built-in HDD, an external HDD, or a USB memory. Of the memories described above, a memory in which information and data are not recorded and updated may be implemented by a non-volatile read-only memory (ROM).

<Mechanical Configuration Related to Printing>

Figure 3:
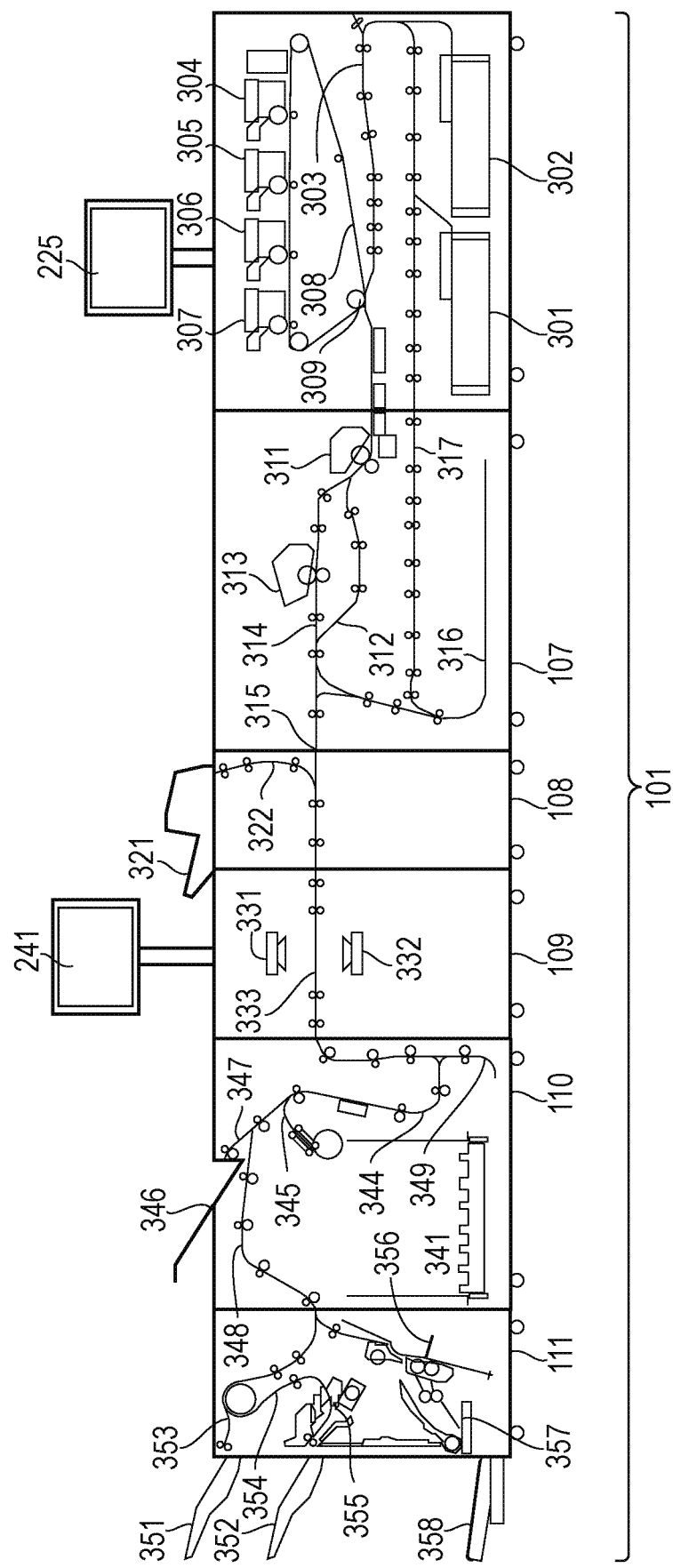
FIG. 3 is a mechanical sectional view of an image forming apparatus.

A mechanical configuration of the image forming apparatus 101 is described with particular attention to a part related to printing, with reference to a mechanical sectional view of the image forming apparatus 101 that is illustrated in FIG. 3. In FIG. 3, components that are in operation during execution of various types of processing related to printing are mainly illustrated, and the rest of the components are omitted from the drawing.

(Printing Apparatus 107)

The printing apparatus 107 is an apparatus configured to form an image by printing on a sheet (a sheet of paper) (namely, an apparatus configured to print). The printing apparatus 107 includes sheet feeding decks 301 and 302, a sheet conveyance path 303, developing stations 304 to 307, an intermediate transfer belt 308, and a fixing unit 311. The printing apparatus 107 also includes sheet conveyance paths 312, 314, and 315, a second fixing unit 313, a sheet inversion path 316, and a double-side conveyance path 317.

The sheet feeding decks 301 and 302 are each configured to separate one sheet that is the topmost sheet in a stack of housed sheets, and convey the separated sheet to the sheet conveyance path 303. The developing stations 304 to 307 are configured to form toner images with the use of color toners Y, M, C, and K, respectively, in order to form a color image. The toner images formed by the developing stations 304 to 307 are transferred by primary transfer to the intermediate transfer belt 308. The intermediate transfer belt 308 is configured to rotate in a direction that is clockwise in FIG. 3. The toner images transferred by primary transfer to the intermediate transfer belt 308 are transferred by secondary transfer at a secondary transfer position 309 to the sheet conveyed from the sheet conveyance path 303.

The display unit 225 is configured to display the status of processing related to printing by the image forming apparatus 101, and various types of information about settings related to printing.

The fixing unit 311 is a unit for fixing a toner image to a sheet. The fixing unit 311 includes a pressure roller and a heating roller, and fixes a toner image to a sheet by melting a toner that has been transferred to the sheet that is passing between the rollers, and pressing the toner to the sheet. The sheet having passed through the fixing unit 311 is conveyed via the sheet conveyance path 312 to the sheet conveyance path 315, along which the sheet is to be output from the printing apparatus 107.

Meanwhile, further melting and pressing for fixing may be executed depending on the type of the sheet. In this case, the sheet having passed through the fixing unit 311 is conveyed to the second fixing unit 313 via another sheet conveyance path (a conveyance path located above the sheet conveyance path 312 in FIG. 3) branched from the sheet conveyance path 312. The second fixing unit 313 is a unit for fixing a toner image to a sheet, as with the fixing unit 311. The sheet having passed through the second fixing unit 313 is conveyed via the sheet conveyance path 314 to the sheet conveyance path 315, along which the sheet is output from the printing apparatus 107.

When the printing apparatus 107 is operating in an image forming mode that involves printing on both sides of a sheet, a sheet conveyed via the sheet conveyance path 312 or 314 is conveyed to the sheet inversion path 316 to be inverted in the sheet inversion path 316. The sheet inverted in the sheet inversion path 316 is conveyed to the double-side conveyance path 317 to receive image transfer (secondary transfer of toner images) on the second side at the secondary transfer position 309.

(Inserter 108)

The inserter 108 is configured to insert a desired sheet (hereinafter also referred to as "insertion sheet") in any place in a series of fed sheets. The inserter 108 includes an inserter tray 321 and a sheet conveyance path 322.

An insertion sheet placed on the inserter tray 321 is conveyed via the sheet insertion path 322 so as to join sheets conveyed from a conveyance path that is used to convey fed sheets. This allows insertion of an insertion sheet in any place in a series of sheets conveyed from the printing apparatus 107 and conveyance of the series of sheets with the insertion sheet inserted to an apparatus in the downstream.

(Verification Apparatus 109)

A sheet having passed through the inserter 108 is conveyed to the verification apparatus 109. The verification apparatus 109 includes cameras 331 and 332 and a sheet conveyance path 333. The cameras 331 and 332 are supported so as to face each other across the sheet conveyance path 333, and are image pickup apparatus for reading different sides of a sheet conveyed via the sheet conveyance path 333. In this embodiment, the camera 331 is an image pickup apparatus for reading the upper side of the sheet, and the camera 332 is an image pickup apparatus for reading the lower side of the sheet.

The verification apparatus 109 reads an image printed on each side of a sheet with the use of the cameras 331 and 332, at the time when the sheet conveyed to the sheet conveyance path 333 arrives at a given point. This allows the verification apparatus 109 to determine whether the image read from each side of the sheet is normal (that is, whether printing has correctly or appropriately been performed) by comparing the read image to a correct image, which is registered in advance.

The display unit 241 is configured to display various types of information related to verification by the verification apparatus 109 (for example, information depending on the result of the verification).

(Stacker 110)

The stacker 110 is configured so that a number of sheets that are equal to or less than its capacity can be stacked. The image forming apparatus 101 of this embodiment employs a stacker having a relatively large capacity as the stacker 110. The stacker 110 includes a sheet stacking tray 341, sheet conveyance paths 344, 345, 347, and 348, an escape tray 346, and an inversion unit 349.

A sheet having passed through the verification apparatus 109 enters the stacker 110 via the sheet conveyance path 344, and is stacked on the sheet stacking tray 341 via the sheet conveyance path 345.

The escape tray 346 is a sheet delivery tray to be used to deliver a sheet that has been determined to be a defective sheet by the verification apparatus 109. A sheet to be sent to the escape tray 346 (for example, a sheet determined to be a defective sheet) is conveyed via the sheet conveyance paths 344 and 347 to the escape tray 346.

A sheet to be conveyed to the finisher 111 located downstream of the stacker 110 is conveyed via the sheet conveyance path 348 to the downstream processing apparatus (finisher 111).

The inversion unit 349 is a unit for inversing a sheet, and is used to stack target sheets on the sheet stacking tray 341. When target sheets are to be stacked on the sheet stacking tray 341 so that the direction of an arriving sheet and the direction of the sheet at the time of leaving are the same, the sheet is inversed by the inversion unit 349 and then stacked on the sheet stacking tray 341. The inversion operation in the inversion unit 349 is not executed when a sheet is conveyed to the escape tray 346 and when a sheet is conveyed to the finisher 111 in the downstream because, in those cases, the sheet is discharged as it is, without being flipped at the time of joining a stack.

(Finisher 111)

The finisher 111 is configured to perform finishing processing on a sheet conveyed thereto, based on a function specified by the user. Specific examples of finishing functions of the finisher 111 include stapling (one-position stapling and two-position stapling), punching (two holes and three holes), and saddle stich binding. The finisher 111 includes sheet delivery trays 351 and 352, sheet conveyance paths 353, 354, and 357, a processing unit 355, a saddle stitching processing unit 356, and a saddle stitch binding tray 358.

When a sheet fed to the finisher 111 is not to receive stapling and other types of finishing processing, the fed sheet is delivered to the sheet delivery tray 351 via the sheet conveyance path 353.

When a sheet fed to the finisher 111 is to receive stapling and other types of finishing processing, on the other hand, the fed sheet is conveyed to the processing unit 355 via the sheet conveyance path 354. The processing unit 355 performs finishing processing that corresponds to a finishing function specified by the user on the conveyed sheet. The sheet subjected to finishing processing in the processing unit 355 is delivered to the sheet delivery tray 352.

The sheet delivery trays 351 and 352 are each supported so that the sheet delivery tray can ascend and descend. The sheet delivery tray 351, for example, may accordingly descend so that sheets subjected to finishing processing in the processing unit 355 can be stacked on the sheet delivery tray 351.

When saddle stitch binding is specified, the saddle stitching processing unit 356 executes binding by, for example, performing stapling processing on a central part of sheets, and then folding the sheets in half. The bound sheets (hereinafter also referred to as "saddle stitch-bound bundle") are delivered to the saddle stitch binding tray 358 via the sheet conveyance path 357. The saddle stitch binding tray 358 has, for example, a belt conveyor configuration in which the saddle stich-bound bundle loaded on the saddle stitch binding tray 358 is conveyed leftward in FIG. 3.

<Display Screen>

An example of display screens presented to the user in order for the verification apparatus 109 to receive an instruction about verification of a printed material from the user is described with reference to FIG. 4 to FIG. 13. Display screens illustrated in FIG. 4 to FIG. 13 are each displayed at a given output destination based on an instruction of the CPU 238 of the verification apparatus 109. In this embodiment, the display screens illustrated in FIG. 4 to FIG. 13 are displayed on the display unit 241 of the verification apparatus 109.

The verification apparatus 109 compares an image that is read from a sheet conveyed thereto (hereinafter also referred to as "sheet image") to a correct image set in advance, with respect to verification items set in advance, to thereby verify the sheet image. Examples of the method of comparing images include comparing pixel values for each image position, comparing positions of an object by edge detection, and comparing pieces of character data extracted by optical character recognition (OCR). Examples of the verification items include the hue of the image, the density of the image, streaks and fading, and blank spots.

(Main Setting Screen)

Figure 4:
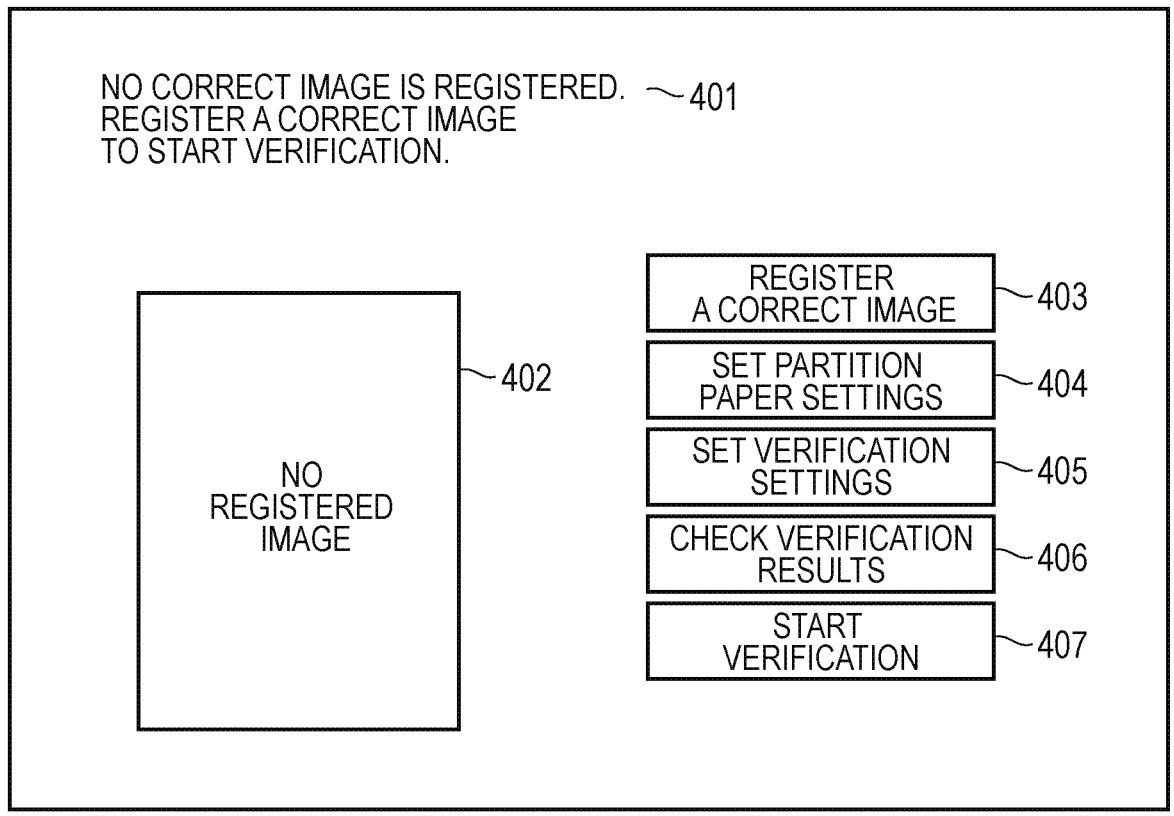
FIG. 4 is an example of a screen to be displayed when a verification apparatus is activated.

FIG. 4 is an example of a screen that is displayed on the display unit 241 when the verification apparatus 109 is activated.

A display area 401 displays a message prompting the user to register a correct image in order to start verification of a printed material because no correct image is registered.

When there is a correct image that has been registered, the correct image is displayed in a display area 402. In the example of FIG. 4, information indicating that a correct image is unregistered is displayed because no correct image is registered. The display area 402 may display, other than a correct image, information about settings related to verification of a printed material, for example, settings of partition paper.

A button 403 is a button used to receive an instruction about the calling up of a correct image registration screen from the user. A correct image is an image to be compared with an image that is read by the verification apparatus 109 from a sheet (printed material) conveyed to the verification apparatus 109, and an image that is read by the verification apparatus 109 from a sheet visually confirmed in advance to be a normal print is used as a correct image.

A button 404 is a button used to receive an instruction about calling up a setting screen related to partition paper from the user. When partition paper is determined to be a defective sheet by comparison of an image read from partition paper to the correct image and the sheet discharge destination is consequently changed, the partition paper for partitioning a plurality of sheets of a final product (printed material) for each or every given number of sheets is no longer discharged to the same discharge destination as that of final products determined to be normal sheets. It is therefore preferred to register settings information about partition paper on the above-mentioned setting screen related to partition paper when a print job including partition paper is to be verified. This allows the verification apparatus 109 to operate so that a sheet conveyed thereto and determined to be partition paper is discharged to the same sheet discharge destination as that of normal sheets without being verified.

A button 405 is a button used to receive an instruction about calling up a setting screen related to verification of a printed material from the user. The setting screen related to verification of a printed material is a screen on which the specification of settings information about verification items and verification precision (for example, at what degree of difference from a correct image a read image is determined to be a defective image) is received. The user can specify verification items and a verification precision that are suitable for a verification purpose through this setting screen.

A button 406 is a button used to receive an instruction about calling up a verification result checking screen from the user. The user can check the contents and results of past verification through this checking screen.

A button 407 is a button used to receive an instruction about starting verification from the user. When an instruction about starting verification is received via the button 407, the verification apparatus 109 starts the reading of an image from a sheet (a sheet image) conveyed thereto and verification of the read sheet image.

(Correct Image Registration Screen)

Figure 5A:
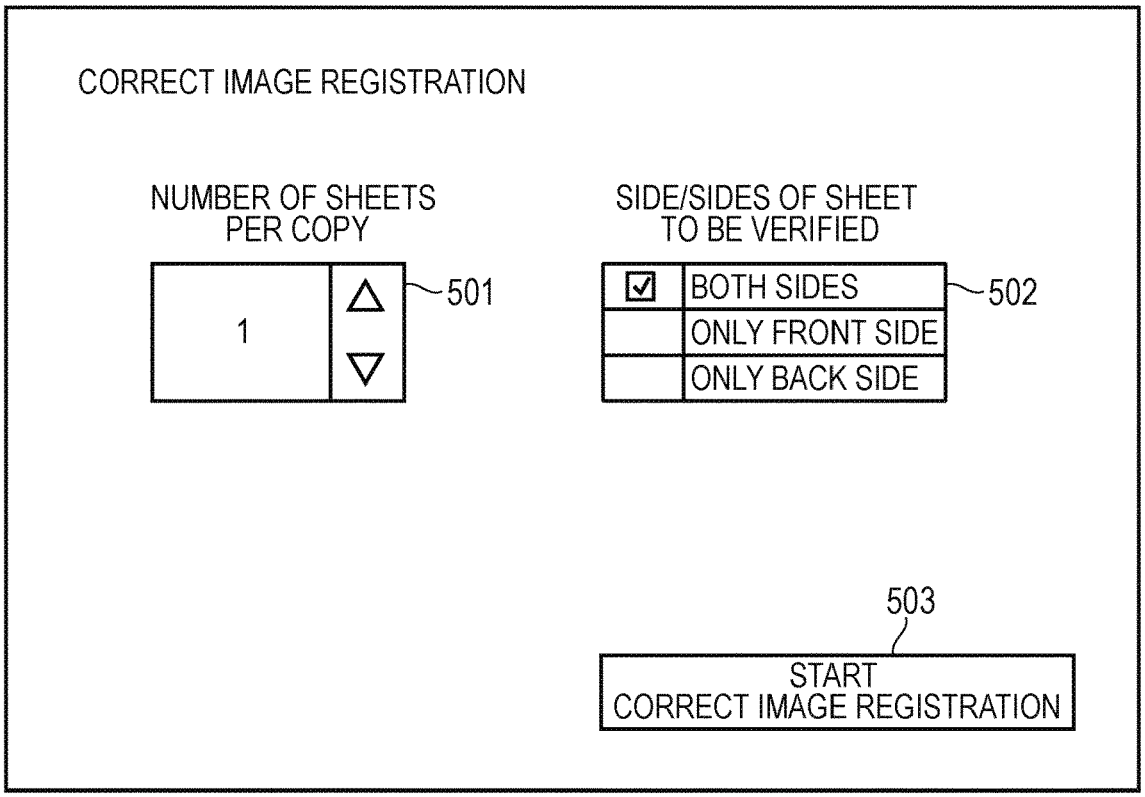
FIG. 5A is an example of a screen for receiving specification of settings information related to registration of a correct image from a user.
Figure 5B:
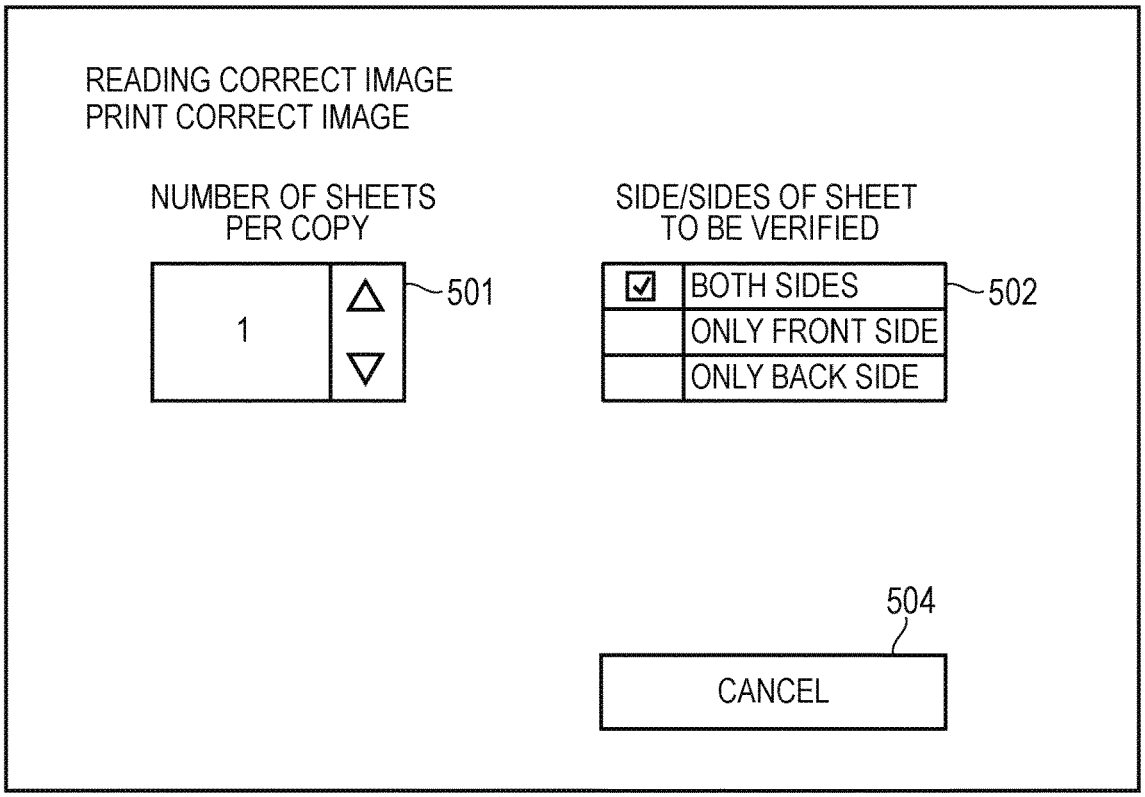
FIG. 5B is an example of a screen to be displayed during reading of a correct image.

An example of a correct image registration screen is illustrated in FIG. 5A and FIG. 5B. Specifically, FIG. 5A is an example of a screen on which the specification of settings information related to registration of a correct image is received from the user. FIG. 5B is an example of a screen to be displayed during the reading of a correct image.

FIG. 5A is described first. A display screen illustrated in FIG. 5A is displayed on the display unit 241 of the verification apparatus 109 when the button 403 illustrated in FIG. 4 is pressed.

A setting area 501 is a setting area for receiving, from the user, the specification of settings information about the number of sheets per copy of a print job to be verified. When a print job in which the number of sheets per copy is two or more is to be verified, settings information about the number of sheets per copy is specified in the setting area 501, and a plurality of images can thus be registered in the verification apparatus 109 as correct images.

A setting area 502 is a setting area for receiving, from the user, the specification of settings information about which side of a sheet is to be verified. Specifically, the specification of which side of a conveyed sheet is to be verified out of "both sides," "only the front side," and "only the back side" can be received in the setting area 502. The settings information about which side of a sheet is to be verified may not always be consistent with settings information about which side of a sheet is to receive printing. As a specific example, both sides of a sheet may be specified as sides to be verified even when printing is performed only on one side, to thereby allow the unprinted side to be verified for the adhesion of specks.

A button 503 is a button used to receive an instruction about starting registration of a correct image from the user. When detecting the press of the button 503, the verification apparatus 109 reads an image of a sheet conveyed after the press of the button 503 and registers the read image as a correct image.

FIG. 5B is described next. When the button 503 illustrated in FIG. 5A is pressed, a display screen illustrated in FIG. 5B is displayed on the display unit 241 of the verification apparatus 109. The display screen illustrated in FIG. 5B is kept to be displayed until the reading of as many sheets as a number specified in the setting area 501 is completed.

A button 504 is a button used to receive an instruction about halting the reading of a correct image from the user. When detecting the press of the button 504, the verification apparatus 109 halts processing related to the reading of a correct image. In this case, registration of a correct image is not executed and the display screen illustrated in FIG. 5A is displayed anew on the display unit 241 of the verification apparatus 109.

An example of screens that are displayed on the display unit 241 of the verification apparatus 109 after the reading of a correct image is completed, depending on the result of reading a correct image, is illustrated in FIG. 6A and FIG. 6B. Specifically, FIG. 6A is an example of a screen on which specification related to correct image registration is received from the user. FIG. 6B is an example of a screen on which an instruction about the setting of a verification skip area to a correct image is received from the user. Details of the verification skip area are described later.

FIG. 6A is described first. When the reading of a correct image is executed with the press of the button 503 illustrated in FIG. 5A, a display screen illustrated in FIG. 6A is displayed on the display unit 241 of the verification apparatus 109 after the reading of the correct image is completed.

A display area 601 is an area in which an image of a sheet read by the verification apparatus 109 is displayed.

A switching button 602 is a button used to receive, from the user, an instruction about switching a sheet image to be displayed in the display area 601 when the verification apparatus 109 reads images of a plurality of sheets.

A switching button 603 is a button used to receive, from the user, an instruction about switching an image of a side (front side or back side) of a sheet to be displayed in the display area 601 when the verification apparatus 109 reads images of both sides of a sheet (that is, when the front side and the back side are both to be verified).

A button 604 is a button used to receive an instruction about setting a verification skip area from the user. In some cases of printing, printed contents of a specific area are varied from copy to copy as in Variable Data Printing (VDP). Specifically, a case of printing a different ID for each copy, and a case of varying printed contents of the address, the name, and similar types of information from copy to copy qualify as an example of printing in which printed contents of a specific area are varied from copy to copy. In such cases, the setting of the verification skip area to the specific area allows the verification apparatus 109 to exclude the specific area from verification targets.

A button 605 is a button used to receive an instruction for registering, as a correct image, an image that is displayed in the display area 601 from the user. When detecting the press of the button 605, the verification apparatus 109 registers, as a correct image, an image displayed in the display area 601. The verification apparatus 109 displays anew the display screen illustrated in FIG. 4 on the display unit 241 when the registration of the correct image is completed.

A button 606 is a button used to receive an instruction about canceling the reading of a correct image from the user. When detecting the press of the button 606, the verification apparatus 109 displays anew the display screen illustrated in FIG. 4 on the display unit 241 without executing correct image registration.

FIG. 6B is described next. When the button 604 illustrated in FIG. 6A is pressed, a display screen illustrated in FIG. 6B is displayed on the display unit 241 of the verification apparatus 109.

An area 611 is an area indicating a verification skip area.

A setting area 612 is a setting area used to receive, from the user, an instruction about changing a position in a correct image to which the area 611 is set.

A setting area 613 is a setting area used to receive an instruction about changing the size of the area 611 from the user.

A button 614 is a button used to receive an instruction about registration of a verification skip area from the user. When detecting the press of the button 614, the verification apparatus 109 registers, as a verification skip area, the area 611 set in the correct image that is displayed in the display area 601. The verification apparatus 109 displays anew the display screen illustrated in FIG. 6A on the display unit 241 when the registration of the verification skip area is completed.

A button 615 is a button used to receive, from the user, an instruction about registering another verification skip area in addition to the already registered verification skip area. When detecting the press of the button 615, the verification apparatus 109 keeps information of the registered verification skip area, and newly receives an instruction about registering another verification skip area. A plurality of verification skip areas can be registered in this manner.

A button 616 is a button used to receive an instruction about canceling the setting of a verification skip area from the user. When detecting the press of the button 616, the verification apparatus 109 displays anew the display screen illustrated in FIG. 6A on the display unit 241 without registering a verification skip area.

(Setting Screens Related to Partition Paper)

Figure 7A:
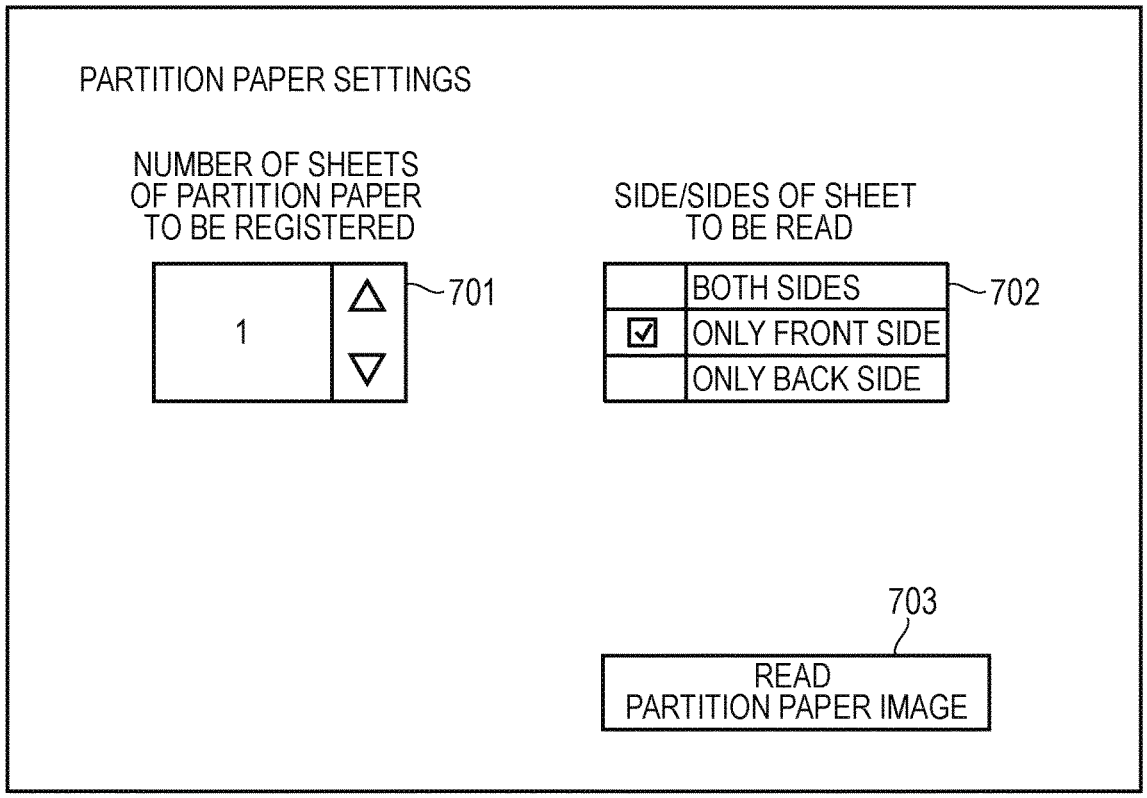
FIG. 7A is an example of a screen for receiving specification of settings information related to registration of an image of partition paper from the user.
Figure 7B:
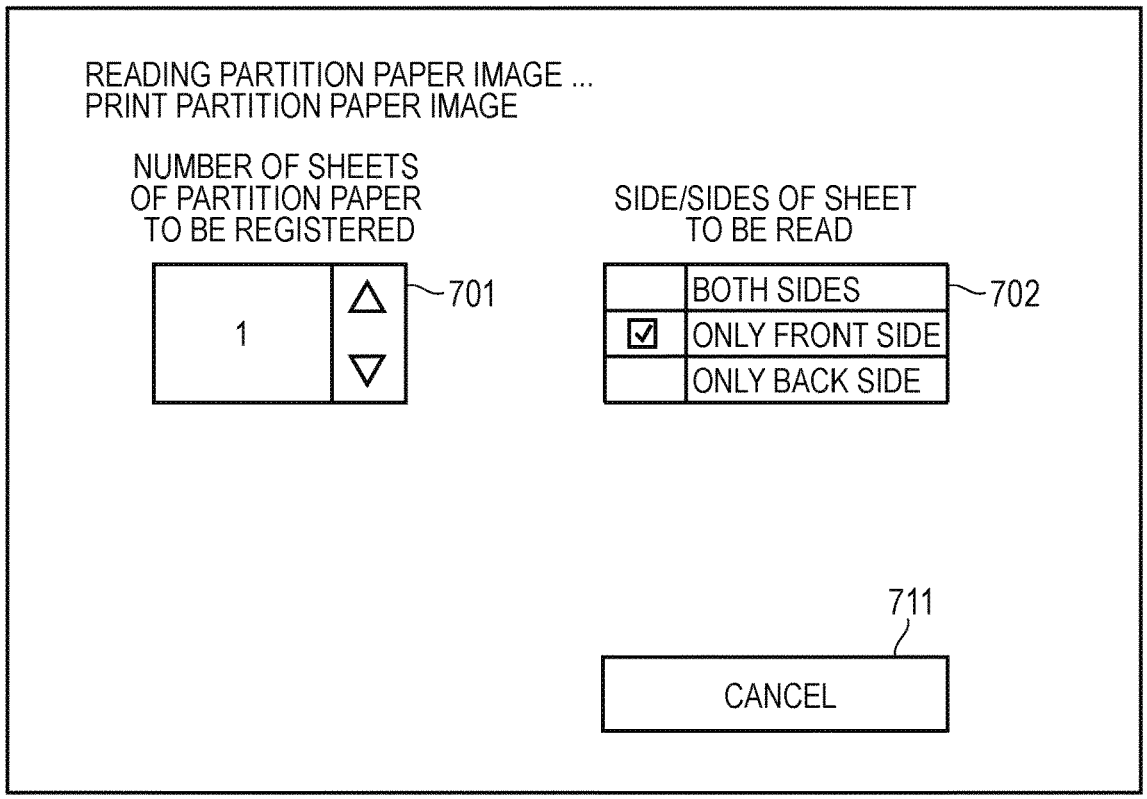
FIG. 7B is an example of a screen to be displayed during reading of a partition paper image.

An example of a setting screen related to partition paper is illustrated in FIG. 7A and FIG. 7B. Specifically, FIG. 7A is an example of a screen on which the specification of settings information about registration of an image of partition paper (hereinafter also referred to as "partition paper image") is received from the user. FIG. 7B is an example of a screen displayed during the reading of a partition paper image.

FIG. 7A is described first. A display screen illustrated in FIG. 7A is displayed on the display unit 241 of the verification apparatus 109 when the button 404 illustrated in FIG. 4 is pressed.

A setting area 701 is a setting area for receiving, from the user, the specification of settings information about the number of sheets of partition paper to be registered. In a case of registering a plurality of types of partition paper differing in the method of determining partition paper, the plurality of types of partition paper can be registered in the verification apparatus 109 by specifying settings information about the number of sheets of partition paper to be registered in the setting area 701.

A setting area 702 is a setting area for receiving, from the user, the specification of settings information about a side to be read, which includes a condition for determining partition paper. Specifically, the specification of which side of partition paper is to be read out of "both sides," "only the front side," and "only the back side" can be received in the setting area 702.

A button 703 is a button used to receive an instruction about starting reading of a partition paper image from the user. When detecting the press of the button 703, the verification apparatus 109 reads an image of a sheet conveyed after the press of the button 703 and registers the read image as a partition paper image.

FIG. 7B is described next. When the button 703 illustrated in FIG. 7A is pressed, a display screen illustrated in FIG. 7B is displayed on the display unit 241 of the verification apparatus 109. The display screen illustrated in FIG. 7B is kept being displayed until the reading of as many sheets as a number specified in the setting area 701 is completed.

A button 711 is a button used to receive an instruction about halting the reading of a partition paper image from the user. When detecting the press of the button 711, the verification apparatus 109 halts processing related to the reading of a partition paper image. In this case, registration of a partition paper image is not executed and the display screen illustrated in FIG. 7A is displayed anew on the display unit 241 of the verification apparatus 109.

Figure 8:
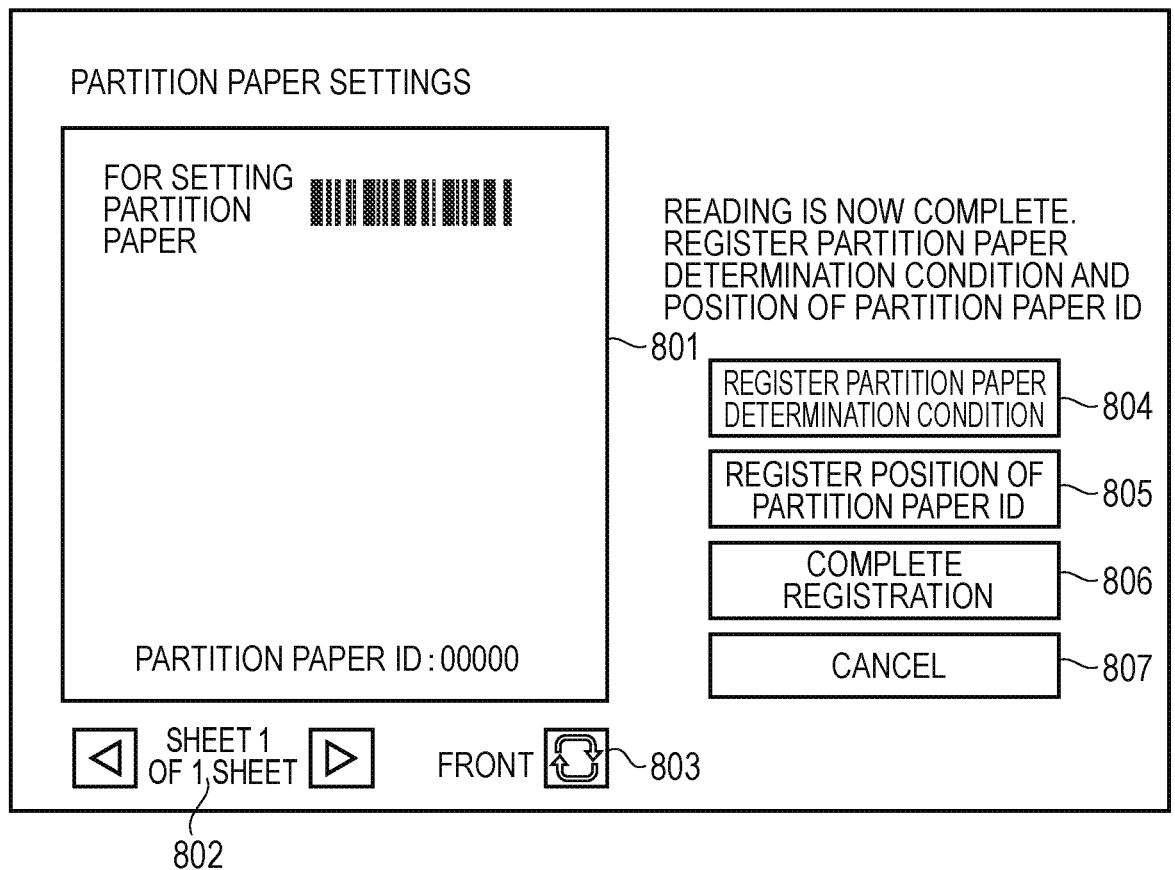
FIG. 8 is an example of a screen to be displayed depending on a result of reading a partition paper image.

An example of a screen that is displayed on the display unit 241 of the verification apparatus 109 after the reading of a partition paper image is completed, depending on the result of reading a partition paper image, is illustrated in FIG. 8.

A display area 801 is an area in which an image of a sheet read by the verification apparatus 109 is displayed.

A switching button 802 is a button used to receive, from the user, an instruction about switching a sheet image to be displayed in the display area 801 when the verification apparatus 109 reads images of a plurality of sheets.

A switching button 803 is a button used to receive, from the user, an instruction about switching an image of a side (front side or back side) of a sheet to be displayed in the display area 801 when the verification apparatus 109 reads images of both sides of a sheet (that is, when the front side and the back side are both to be verified).

A button 804 is a button used to receive an instruction about registration of a condition for determining partition paper from the user. In order to avoid a situation in which partition paper is determined to be a defective sheet by the verification apparatus 109 and is switched to a different sheet discharge destination, a barcode or other types of information (for example, a mark) by which the verification apparatus 109 can determine that a read sheet is partition paper is printed on partition paper. A condition by which the verification apparatus 109 determines a read sheet to be partition paper, as those given above as an example, can be registered on a screen displayed with the press of the button 804 (a display screen described later with reference to FIG. 9A).

A button 805 is a button used to receive, from the user, an instruction about registration of a position of a partition paper ID for identifying partition paper. A different ID is printed on each sheet of partition paper in order to display a verification result for each bundle of sheets that are printed materials out of a plurality of bundles separated from one another by partition paper. This allows the verification apparatus 109 to identify, based on the result of reading the partition paper ID, each of the plurality of bundles separated from one another by partition paper, and present the verification result for each bundle to the user. A position on partition paper at which an ID is printed on the partition paper can be registered on a screen displayed with the press of the button 805 (a display screen described later with reference to FIG. 9B).

A button 806 is a button used to receive an instruction about registration of settings information that is related to partition paper from the user. When detecting the press of the button 806, the verification apparatus 109 registers, as settings information related to partition paper, information specified on the display screens described later with reference to FIG. 9A and FIG. 9B. The verification apparatus 109 displays anew the display screen illustrated in FIG. 4 on the display unit 241 when the registration of the settings information related to partition paper is completed.

A button 807 is a button used to receive an instruction about canceling registration of settings information that is related to partition paper from the user. When detecting the press of the button 807, the verification apparatus 109 displays anew the display screen illustrated in FIG. 4 on the display unit 241 without registering settings information that is related to partition paper.

An example of display screens for receiving, from the user, the specification of settings information that is related to partition paper read by the verification apparatus 109 is illustrated in FIG. 9A and FIG. 9B. Specifically, FIG. 9A is an example of a screen on which specification about registration of a condition for determining partition paper is received from the user. FIG. 9B is an example of a screen on which an instruction about registration of a position of a partition paper ID is received from the user.

FIG. 9A is described first. A display screen illustrated in FIG. 9A is displayed on the display unit 241 of the verification apparatus 109 when the button 804 illustrated in FIG. 8 is pressed.

An area 901 is an area indicating a partition paper determination area by which whether a read sheet is partition paper is determined.

A setting area 902 is a setting area used to receive, from the user, an instruction about changing a position in a partition paper image to which the area 901 is set.

A setting area 903 is a setting area used to receive an instruction about changing the size of the area 901 from the user.

A setting area 904 is a setting area used to receive, from the user, the specification of an element by which the verification apparatus 109 determines a read sheet to be partition paper. The specification of one of "barcode," "QR code," and "image" can be received in the setting area 904 as an element by which the verification apparatus 109 determines a read sheet to be partition paper. The verification apparatus 109 selectively switches, depending on the element specified in the setting area 904, the method of determining whether a conveyed sheet is partition paper based on the result of reading the partition paper determination area.

For instance, when "barcode" or "QR code" is set in the setting area 904, the verification apparatus 109 detects a barcode or a QR code from the partition paper determination area, and reads the detected barcode or the detected QR code. In this case, the verification apparatus 109 determines whether a sheet conveyed thereto is partition paper based on the result of reading the barcode or the QR code.

As another example, when "image" is specified in the setting area 904, the verification apparatus 109 reads an image in the partition paper determination area, and compares the read image to an image indicating partition paper that is registered in advance, to thereby determine whether a sheet conveyed thereto is partition paper.

A button 905 is a button used to receive, from the user, an instruction about registration of a partition paper determination condition. When detecting the press of the button 905, the verification apparatus 109 registers, as a partition paper determination area, the area 901 set in a correct image that is displayed in the display area 801, and also registers an element specified in the setting area 904 as an element for determining a read sheet as partition paper. The verification apparatus 109 displays anew the display screen illustrated in FIG. 8 on the display unit 241 when the registration of a partition paper determination condition is completed.

A button 906 is a button used to receive an instruction about canceling registration of the partition paper determination condition from the user. When detecting the press of the button 906, the verification apparatus 109 displays anew the display screen illustrated in FIG. 8 on the display unit 241 without registering the partition paper determination condition (for example, registering the partition paper determination area).

FIG. 9B is described next. When the button 805 illustrated in FIG. 8 is pressed, a display screen illustrated in FIG. 9B is displayed on the display unit 241 of the verification apparatus 109.

An area 911 is an area indicating a partition paper ID identification area in which a partition paper ID is to be read.

A setting area 912 is a setting area used to receive, from the user, an instruction about changing a position in a partition paper image to which the area 911 is set.

A setting area 913 is a setting area used to receive an instruction about changing the size of the area 911 from the user.

A button 914 is a button used to receive an instruction about registration of a partition paper ID from the user. When detecting the press of the button 914, the verification apparatus 109 registers, as the partition paper ID identification area, the area 911 set in the correct image that is displayed in the display area 801. The verification apparatus 109 displays anew the display screen illustrated in FIG. 8 on the display unit 241 when the registration of the partition paper ID is completed.

A button 915 is a button used to receive an instruction about canceling registration of the partition paper ID from the user. When detecting the press of the button 915, the verification apparatus 109 displays anew the display screen illustrated in FIG. 8 on the display unit 241 without registering the partition paper ID (for example, registering the partition paper ID identification area).

(Setting Screens Related to Verification of a Printed Material)

Figure 10:
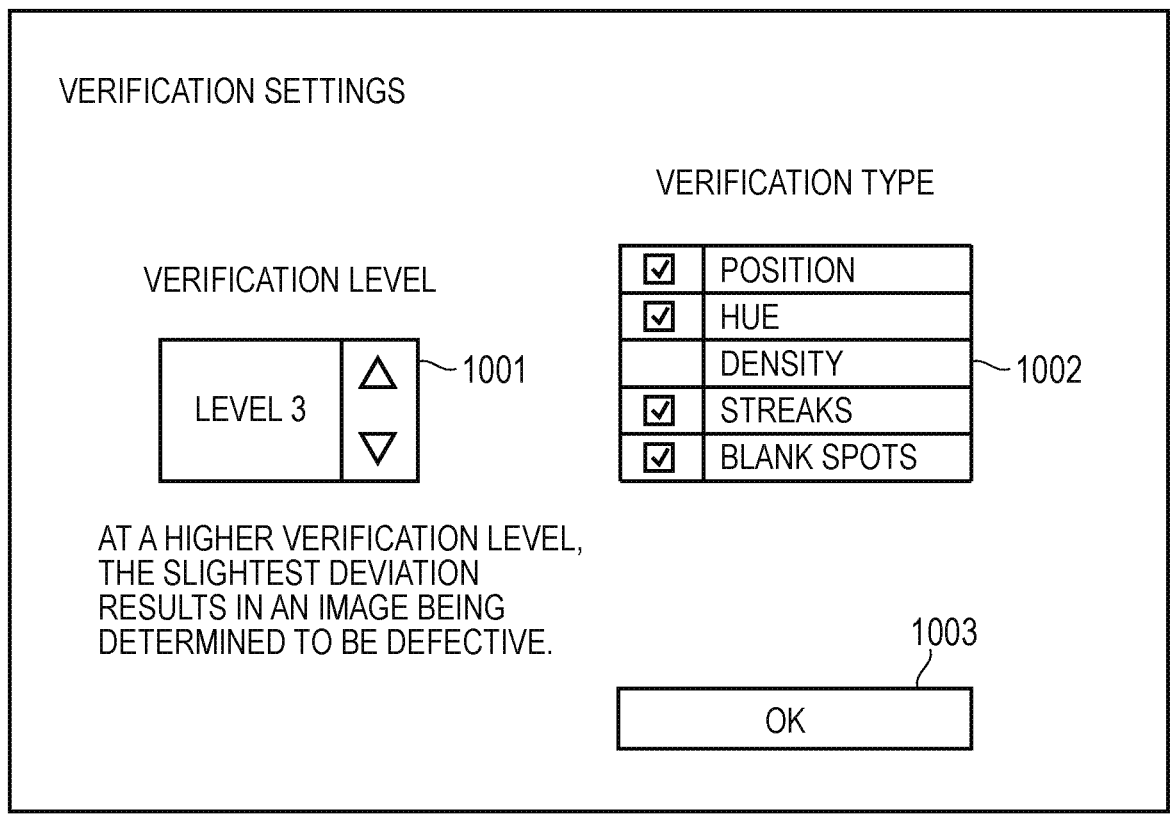
FIG. 10 is an example of a setting screen related to verification of a printed material.

An example of a setting screen related to verification of a printed material is illustrated in FIG. 10. A display screen illustrated in FIG. 10 is displayed on the display unit 241 of the verification apparatus 109 with the press of the button 405 illustrated in FIG. 4.

A setting area 1001 is a setting area used to receive the specification of a verification level with regard to verification of a printed material from the user. The verification level indicates an index for the degree of precision with regard to verification of a printed material, and, at a higher verification level, a printed material is verified with a higher precision. In the verification apparatus 109, the condition for determining a read image to be a normal image is stricter as the precision becomes higher with regard to verification of a printed material. Specifically, when the precision is higher with regard to verification of a printed material, the verification apparatus 109 determines a read image to be a defective image based on a smaller difference detected between a correct image and the read image.

A setting area 1002 is a setting area used to receive the specification of a verification type with regard to verification of a printed material from the user. The setting area 1002 presents a list of verification items that can be specified as an aspect of a printed material that is to be verified, and the specification of at least some of the verification items on the list is received in the setting area 1002. In the example illustrated in FIG. 10, "position," "hue," "density," "streaks," and "blank spots" are presented as a list of verification items that can be specified. Of the list of verification items presented in the setting area 1002, "position," "hue," "streaks," and "blank spots" are specified as aspects to be verified in the example of FIG. 10. In this case, the verification apparatus 109 uses "position," "hue," "streaks," and "blank spots" out of the list of verification items as aspects of a printed material that are to be verified, and excludes "density" from aspects of a printed material that are to be verified.

A button 1003 is a button used to receive, from the user, an instruction about causing settings information that is specified in the setting areas 1001 and 1002 to be reflected. When detecting the press of the button 1003, the verification apparatus 109 causes settings information that is specified in the setting areas 1001 and 1002 to be reflected. The verification apparatus 109 displays anew the display screen illustrated in FIG. 4 on the display unit 241 when the settings information about verification of a printed material is finished to be reflected.

(Verification Result Checking Screen)

An example of the verification result checking screen is illustrated in FIG. 11. A display screen illustrated in FIG. 11 is displayed on the display unit 241 of the verification apparatus 109 with the press of the button 406 illustrated in FIG. 4.

A display area 1101 is an area in which an attribute of the entire job that has been verified and information based on the result of the verification are displayed.

A display area 1102 is an area in which information based on partition paper-by-partition paper verification results (that is, verification results of each of the bundles separated from one another by the partition paper) is displayed. A partition paper ID presented in the display area 1102 is information based on the result of reading the partition paper ID identification area that is specified through the display screen illustrated in FIG. 9B. The display area 1102 also displays, for each partition paper ID, the number of sheets determined to be a normal image and the number of sheets determined to be a defective image out of sheets contained in a bundle that is associated with the partition paper ID. For each partition paper ID, the verification apparatus 109 may recognize, as a bundle associated with the partition paper ID, a bundle of a series of sheets between partition paper that is associated with the partition paper ID of interest and partition paper that is associated with a partition paper ID immediately preceding or following the partition paper ID of interest.

A setting area 1103 is a setting area used to receive, from the user, an instruction about switching a job for which verification results are displayed. In the example illustrated in FIG. 11, the first job out of nine jobs for which a history of verification results is kept is specified in the setting area 1103. The display areas 1101 and 1102 accordingly display information based on verification results with respect to the first job. A "preceding job" button and a "next job" button are displayed in the setting area 1103. The "preceding job" button is a button used to receive, from the user, an instruction for newly setting a job that immediately precedes the job for which verification results are currently displayed as a job for which verification results are to be displayed. The "next job" button is a button used to receive, from the user, an instruction for newly setting a job that immediately follows the job for which verification results are currently displayed as a job for which verification results are to be displayed.

A button 1104 is a button used to receive an instruction about finishing checking verification results from the user. When detecting the press of the button 1104, the verification apparatus 109 displays anew the display screen illustrated in FIG. 4 on the display unit 241.

(Display Screens after Verification is Started)

Figure 12A:
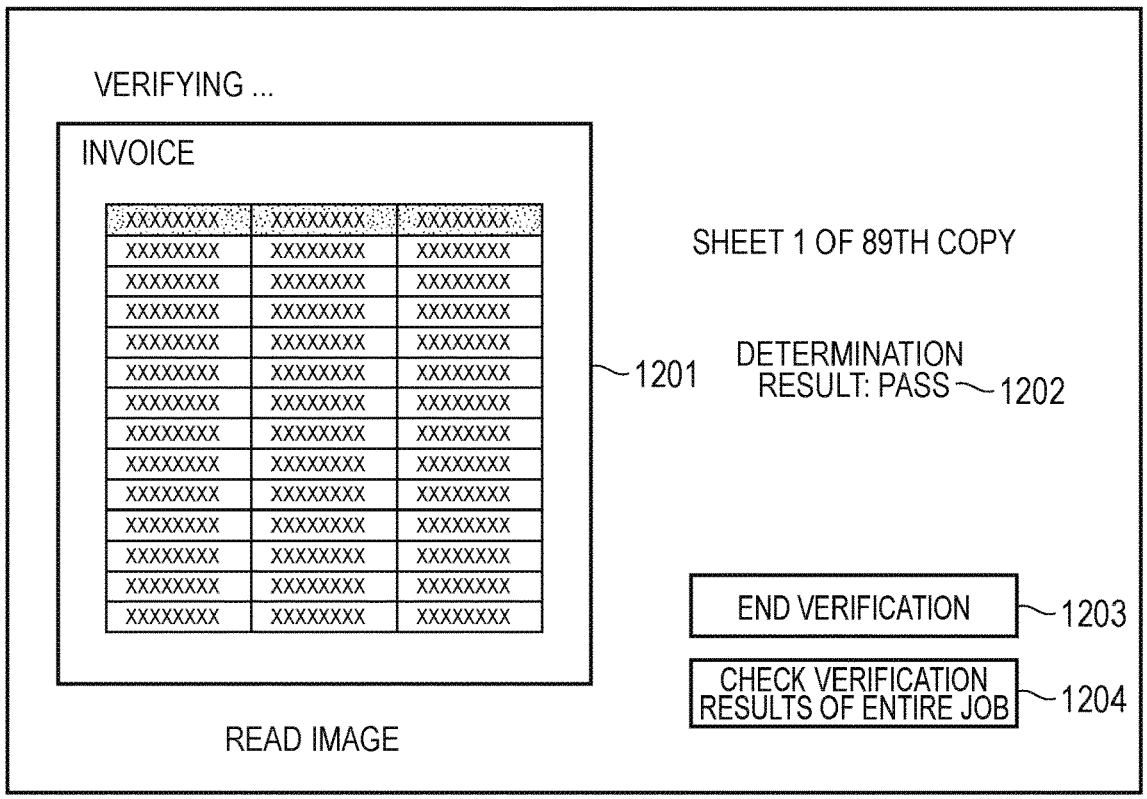
FIG. 12A is an example of a screen to be displayed when an image read from a printed material that is a verification target is determined to be a normal image.
Figure 12B:
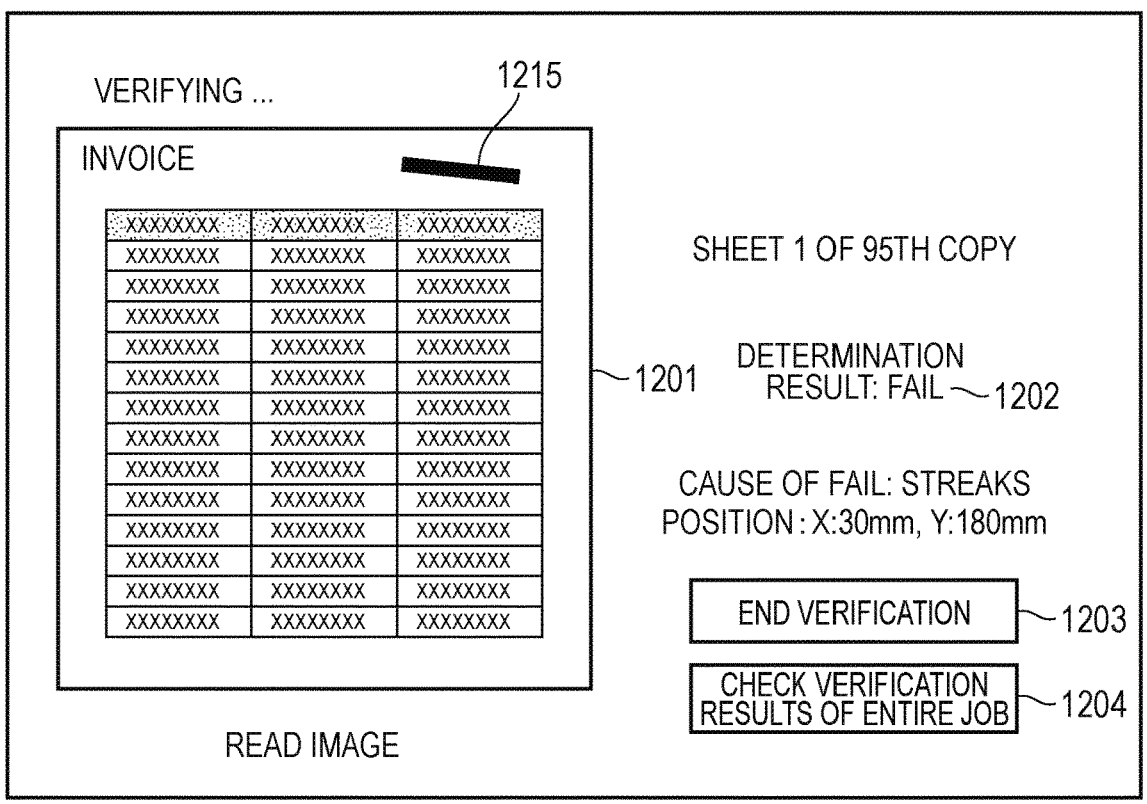
FIG. 12B is an example of a screen to be displayed after verification of a printed material is started.
Figure 13:
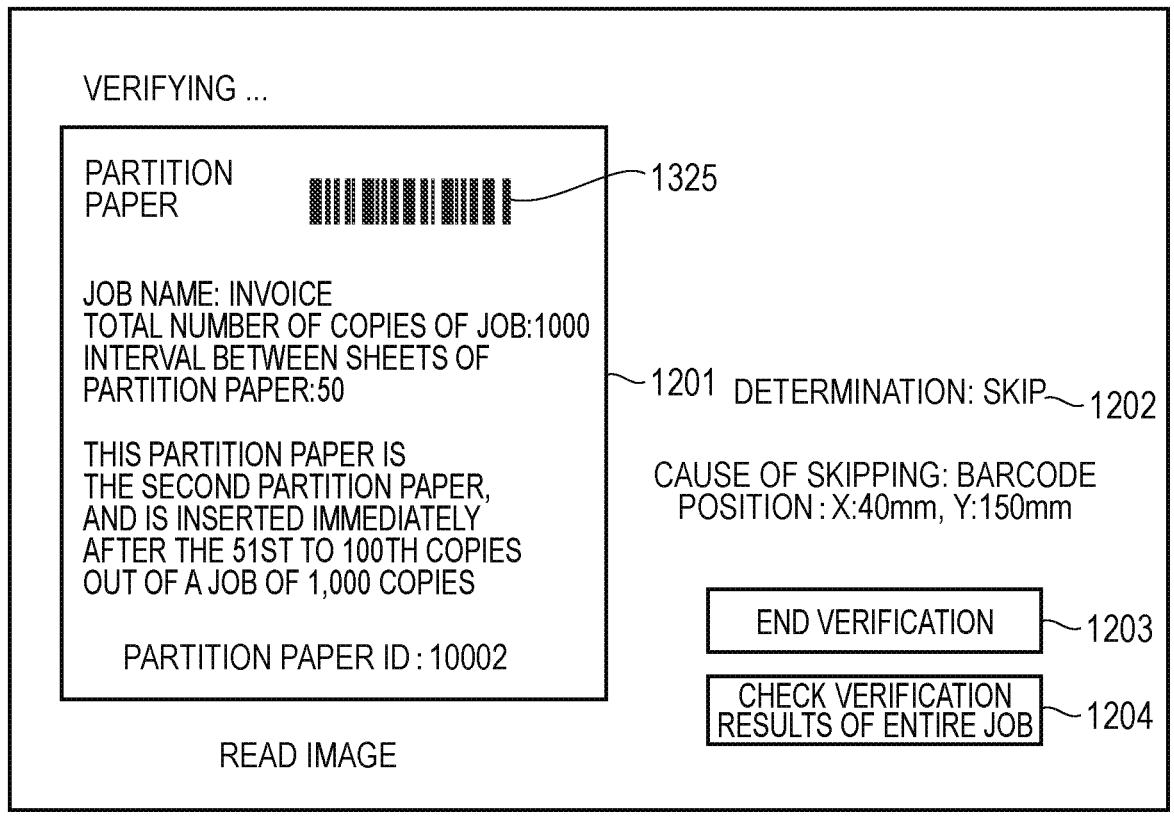
FIG. 13 is an example of a screen to be displayed when an image read from a printed material that is a verification target is determined to be a defective image.

Examples of display screens displayed after verification of a printed material is started are illustrated in FIG. 12A, FIG. 12B, and FIG. 13. Specifically, FIG. 12A is an example of a screen displayed when an image read from a printed material to be verified is determined to be a normal image. FIG. 12B is an example of a screen displayed when an image read from a printed material to be verified is determined to be a defective image. FIG. 13 is an example of a screen displayed when a conveyed sheet is determined to be partition paper. The display screens illustrated in FIG. 12A, FIG. 12B, and FIG. 13 are displayed on the display unit 241 of the verification apparatus 109, depending on the verification result of an image that is read from a sheet conveyed after verification is started with the press of the button 407 illustrated in FIG. 4.

FIG. 12A is described first.

A display area 1201 presents an image read by the verification apparatus 109 from a sheet conveyed thereto. When sheets are sequentially conveyed to the verification apparatus 109, the latest image out of images read by the verification apparatus 109 from the sequentially conveyed sheets (that is, an image that has just been read by the verification apparatus 109) is displayed in the display area 1201.

A display area 1202 is a display area that displays information based on the result of comparison between the read image displayed in the display area 1201 and a correct image (namely, information based on the verification result of the conveyed sheet). In the example illustrated in FIG. 12A, the read image is determined to be a normal image and "determination result: pass" is accordingly displayed in the display area 1202 as information indicating this determination result.

A button 1203 is a button used to receive an instruction about ending verification of a printed material from the user. When detecting the press of the button 1203, the verification apparatus 109 ends processing related to verification of a printed material, and displays anew the display screen illustrated in FIG. 4 on the display unit 241.

A button 1204 is a button used to receive an instruction about displaying the verification result checking screen for an entire job from the user. When detecting the press of the button 1204, the verification apparatus 109 displays the display screen illustrated in FIG. 11 on the display unit 241.

FIG. 12B is described next.

In the example illustrated in FIG. 12B, a streak 1215 is detected in a read image displayed in the display area 1201, and the read image is consequently determined to be a defective image. Accordingly, "determination result: fail" is displayed in the display area 1202 as information indicating this determination result. The detection of the streak 1215 as the cause of the determination of "fail" and a position at which the streak 1215 is detected are displayed along with the determination result.

FIG. 13 is described next.

In the example illustrated in FIG. 13, a barcode 1325 is detected in a read image displayed in the display area 1201, and a sheet conveyed immediately before (namely, a sheet from which the read image displayed in the display area 1201 has been read) is consequently be determined to be partition paper. "Determination: skip" is accordingly displayed in the display area 1202 as information indicating that verification has been skipped.

(Verification Job Setting Screen)

Figure 14:
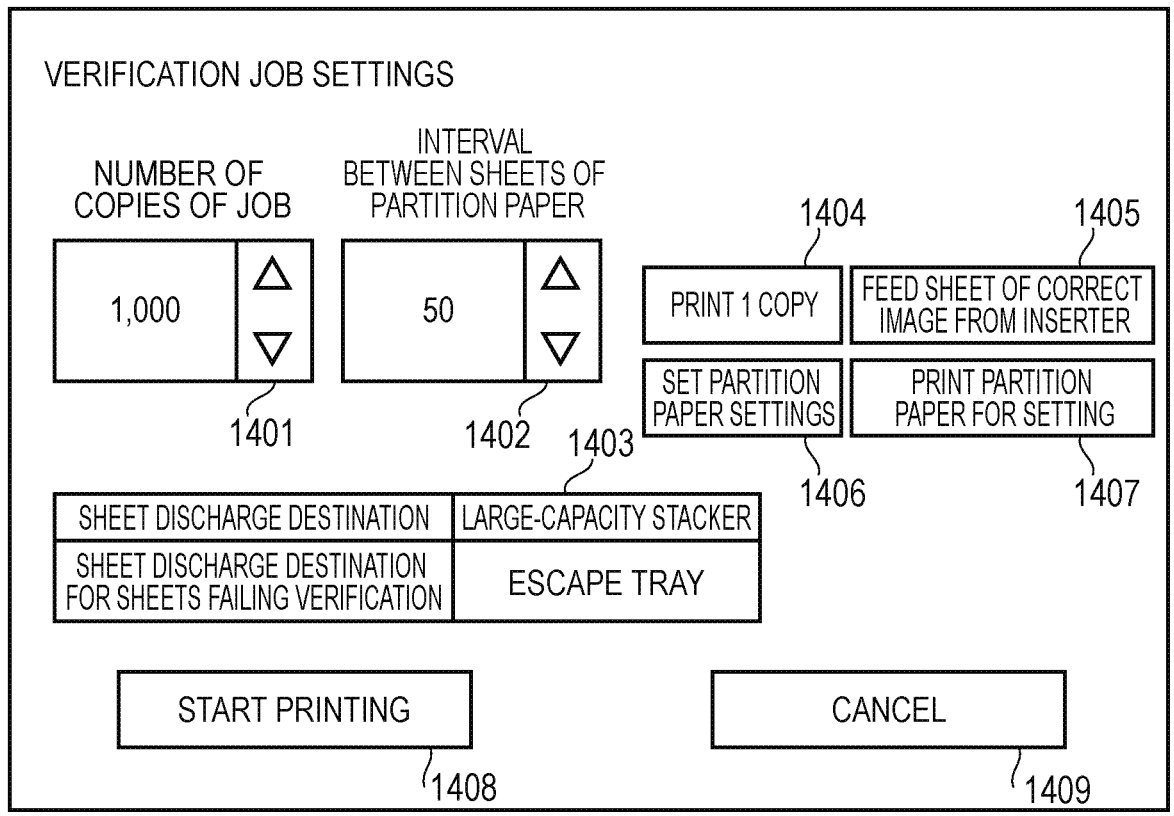
FIG. 14 is an example of a display screen for receiving an instruction about verification of a printed material.

An example of a display screen presented to the user in order for the external controller 102 to receive an instruction about verification of a printed material by the verification apparatus 109 from the user is described with reference to FIG. 14. A display screen illustrated in FIG. 14 is displayed on a given output destination based on an instruction of the CPU 208 of the external controller 102. In this embodiment, the display screen illustrated in FIG. 14 is displayed on the display unit 212 of the external controller 102. A verification job in this embodiment corresponds to a print job that is accompanied by verification performed by the verification apparatus 109 on a printed material (sheet) that has received printing by the printing apparatus 107.

FIG. 14 is an example of a verification job setting screen. Instructions about the conveyance of a sheet bearing a correct image to the verification apparatus 109, the conveyance of a sheet for settings about partition paper to the verification apparatus 109, and the conveyance of a sheet to be verified to the verification apparatus 109 may be issued from the external controller 102. In this case, the display screen illustrated in FIG. 14 is displayed on the display unit 212 of the external controller 102, and the instructions described above are received from the user through this display screen. In the following description, a sheet for settings about partition paper is also referred to as "partition paper for setting" for the sake of convenience.

A setting area 1401 is a setting area used to receive the specification of the number of sheets (printed materials) to be verified for each job from the user. In the example illustrated in FIG. 14, 1,000 copies of a printed material are printed for each job, and "1,000" is accordingly specified as the number of sheets to be verified for each job.

A setting area 1402 is a setting area used to receive the specification of an interval at which partition paper is inserted from the user. In the example illustrated in FIG. 14, it is specified that partition paper be inserted each time 50 copies of a printed material that have been determined to be normal as a result of verification are output.

A setting area 1403 is a setting area used to receive the specification of a sheet discharge destination of the verification job from the user. In the example illustrated in FIG. 14, "large-capacity stacker" (the stacker 110) is specified as a sheet discharge destination, and "escape tray" (the escape tray 346) is specified as a sheet discharge destination to be used when an image is determined to be a defective image in verification.

A button 1404 is a button used to receive, from the user, an instruction instructing the image forming apparatus 101 to print only one copy of the verification job.

For example, the press of the button 1404 after the verification apparatus 109 is instructed to start registration of a correct image with the press of the button 503 illustrated in FIG. 5A causes the external controller 102 to instruct the image forming apparatus 101 to print one copy of the verification job. As processing related to registration of a correct image, printing processing by the printing apparatus 107 and the reading of a correct image by the verification apparatus 109 are executed based on this instruction.

A button 1405 is a button used to receive, from the user, an instruction to feed a sheet from the inserter 108 when a sheet from which a correct image is to be read is fed from the inserter 108. The button 1405 is used when, for example, an already printed sheet (printed material) is fed from the inserter 108 in order to use the sheet for registration of a correct image.

As a specific example, when a printed material is to be used in registration of a correct image after a visual check of the printed material by the user, instead of executing the printing processing and the processing related to correct image registration as one series of processing steps, the printed material is fed from the inserter 108. In this case, the printed material to be used in correct image registration is fed to the inserter 108 and conveyed to the verification apparatus 109 when the button 1405 is pressed with the printed material placed on the inserter tray 321 of the inserter 108.

In correct image registration, a sheet may be fed from the sheet feeding unit 230 of the printing apparatus 107. When a sheet is fed from the sheet feeding unit 230 of the printing apparatus 107, however, pressure and heat are applied to the sheet passing through the fixing unit 311 and the second fixing unit 313, and an image printed on the sheet may consequently be distorted. In view of this, when a printed material finished being printed is to be used in correct image registration, the printed material (a sheet) is fed from the inserter 108 so that the printed material can be conveyed to the verification apparatus 109 without passing through the fixing unit 311 and the second fixing unit 313.

A button 1406 is used to receive an instruction about settings of partition paper from the user. As a specific example, when detecting the press of the button 1406, the external controller 102 may display a display screen that is substantially the same as the example described with reference to FIG. 7A, FIG. 7B, and FIG. 8 on the display unit 212. The external controller 102 may then receive various instructions about settings of partition paper from the user through this display screen. The specification of an element by which the verification apparatus 109 determines a conveyed sheet to be partition paper (for example, a barcode or a QR code), a position at which the element is printed, and the like can thus be received from the user. This also allows reception, from the user, of specification of the presence or absence of a partition paper ID varied from a sheet of partition paper to another sheet of partition paper, the position of the partition paper ID, and the like.

A button 1407 is a button used to receive an instruction about printing of partition paper for setting from the user. When detecting the press of the button 1407, the external controller 102 instructs the image forming apparatus 101 to print partition paper, based on partition paper settings instructed, by the user, through the display screen displayed with the press of the button 1406, to be set. This causes the printing apparatus 107 to print the element (for example, a barcode or a QR code) by which the verification apparatus 109 determines a conveyed sheet to be partition paper on a sheet, and convey the sheet to the verification apparatus 109.

For example, the press of the button 1407 after the verification apparatus 109 is instructed to start reading a partition paper image with the press of the button 703 illustrated in FIG. 7A causes the external controller 102 to instruct the printing apparatus 107 to print partition paper for setting. In this case, the partition paper for setting that has received printing by the printing apparatus 107 is conveyed to the verification apparatus 109 to be read by the verification apparatus 109. This allows the user to check a partition paper image based on the result of reading the partition paper for setting, register a partition paper determination condition, and issue various instructions about registration of the position of a partition paper ID, through the display screen illustrated in FIG. 8.

A button 1408 is a button used to receive an instruction about starting printing of the verification job from the user. When detecting the press of the button 1408, the external controller 102 transmits the verification job to the image forming apparatus 101 based on settings information that has been specified through the display screen illustrated in FIG. 14. The verification job transmitted to the image forming apparatus 101 is thus input to the printing apparatus 107.

For example, the press of the button 1408 after the verification apparatus 109 is instructed to start verification with the press of the button 407 illustrated in FIG. 4 instructs the external controller 102 to start printing the verification job. In this case, the external controller 102 transmits print data to the image forming apparatus 101, and instructs the image forming apparatus 101 to verify a resultant printed sheet (printed material). The printing apparatus 107 prints on a sheet based on the print data transmitted from the external controller 102, and conveys the printed sheet (printed material) to the verification apparatus 109. The verification apparatus 109 reads an image of the sheet (printed material) conveyed from the printing apparatus 107, and executes processing related to verification of the sheet (for example, determination about whether the read image is a normal image), depending on the result of reading the image.

The output destination of the display screen illustrated in FIG. 14 is not limited to the display unit 212 of the external controller 102. The display screen illustrated in FIG. 14 may be displayed on, for example, the display unit 205 of the terminal apparatus 103. In this case, the CPU 201 of the terminal apparatus 103 may obtain information for displaying the display screen illustrated in FIG. 14 from the external controller 102 via the external LAN 104, and display the display screen on the display unit 205 based on the obtained information. The CPU 201 in this case may transmit information based on instructions that have been received from the user through a display screen to the external controller 102 via the external LAN 104.

The examples described above with reference to FIG. 4 to FIG. 14 are merely given as an example, and are not to limit display screens to be presented to the user in the image forming system according to this embodiment. For example, a display screen corresponding to a function that is not included among functions possessed by the image forming apparatus 101, and a button for calling up the display screen and other components of a screen, may not be provided.

<Processing>

An example of processing of the image forming system according to this embodiment is described with reference to FIG. 15 to FIG. 23.

(Processing Related to Correct Image Registration)

Figure 15:
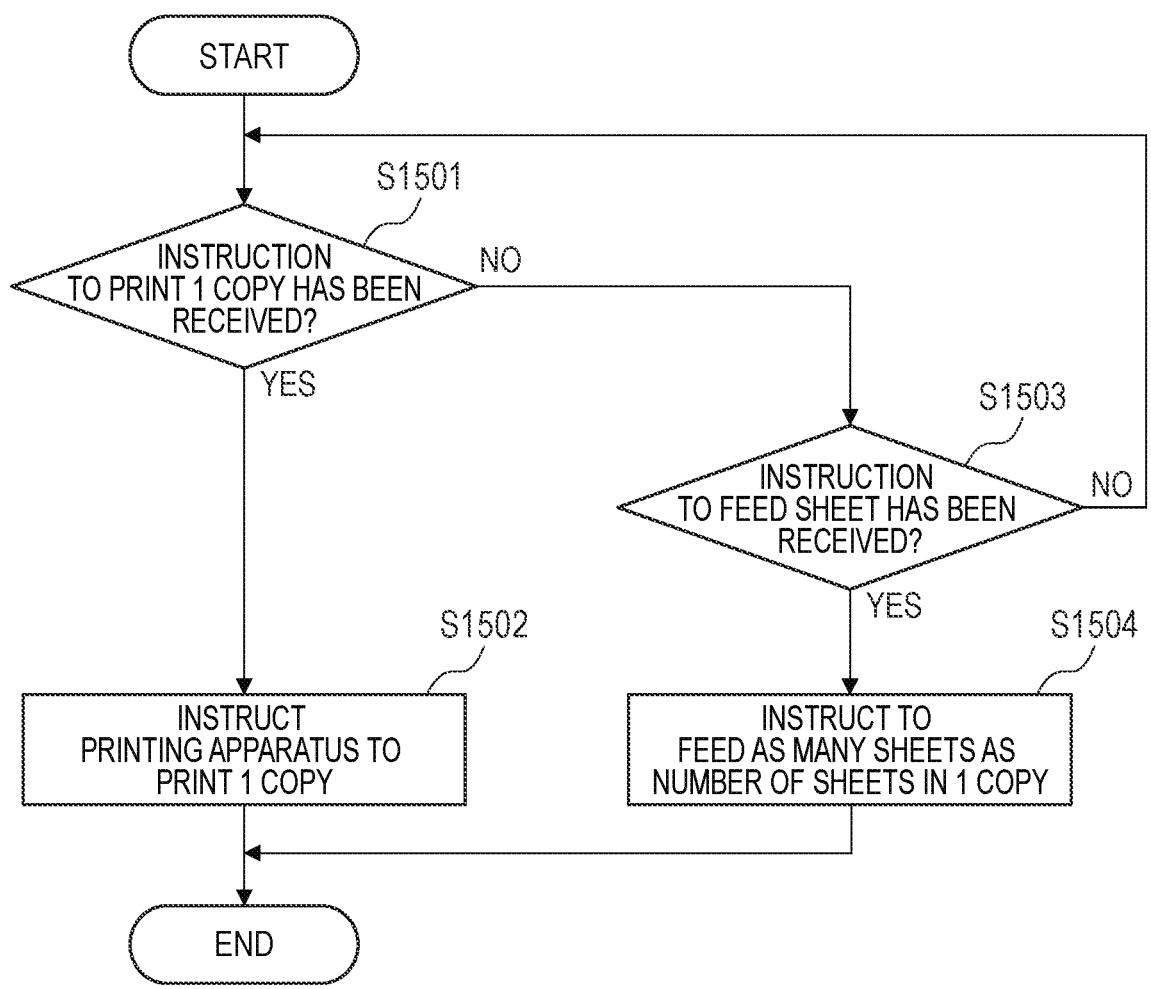
FIG. 15 is a flow chart for illustrating an example of processing of an external controller.

Processing illustrated in FIG. 15 is described. FIG. 15 is a flow chart for illustrating an example of a flow of processing executed by the external controller 102 in registration of a correct image. The processing illustrated in FIG. 15 is implemented by the CPU 208 in the external controller 102 by deploying a program that is stored in the HDD 210 onto the memory 209 and executing the program.

In Step S1501, the external controller 102 determines whether an instruction about printing one copy of a print job has been received. The processing of Step S1501 corresponds to, for example, determination about whether the button 1404 associated with an instruction about printing one copy of a print job has been pressed on the display screen illustrated in FIG. 14.

When it is determined in Step S1501 that an instruction about printing one copy of a print job has been received, the external controller 102 advances the processing to Step S1502. In Step S1502, the external controller 102 transmits print data of one copy to the image forming apparatus 101, and instructs the image forming apparatus 101 to execute printing. The external controller 102 then ends the series of processing steps illustrated in FIG. 15.

When it is determined in Step S1501 that an instruction about printing one copy of a print job has not been received, on the other hand, the external controller 102 advances the processing to Step S1503. In Step S1503, the external controller 102 determines whether an instruction about feeding a sheet from the inserter 108 has been received. The processing of Step S1503 corresponds to, for example, determination about whether the button 1405 associated with an instruction about feeding a sheet from which a correct image is to be read from the inserter 108 has been pressed on the display screen illustrated in FIG. 14.

When it is determined in Step S1503 that an instruction about feeding a sheet from the inserter 108 has been received, the external controller 102 advances the processing to Step S1504. In Step S1504, the external controller 102 instructs the image forming apparatus 101 to feed a sheet from which a correct image is to be read from the inserter 108. The external controller 102 then ends the series of processing steps illustrated in FIG. 15.

When it is determined in Step S1503 that an instruction about feeding a sheet from the inserter 108 has not been received, on the other hand, the external controller 102 returns the processing to Step S1501. In this case, the series of processing steps illustrated in FIG. 15 is executed anew, starting from Step S1501.

Figure 16:
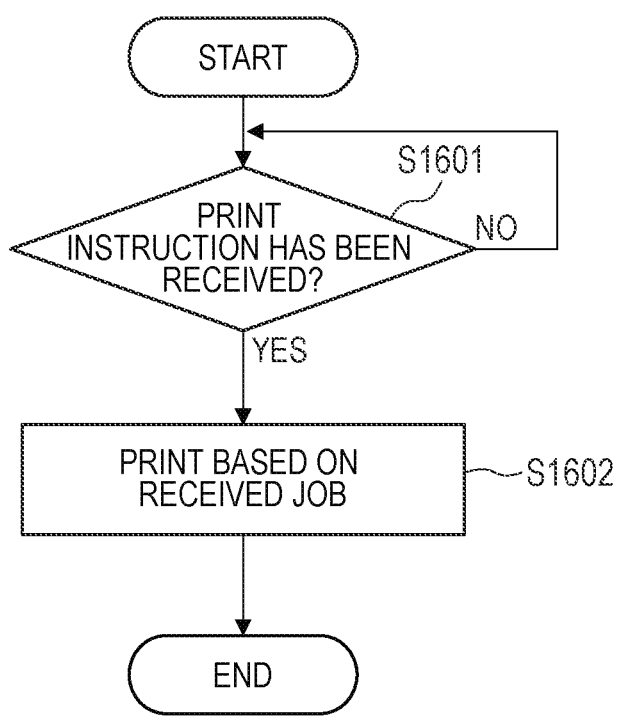
FIG. 16 is a flow chart for illustrating an example of processing of a printing apparatus.

Processing illustrated in FIG. 16 is described. FIG. 16 is a flow chart for illustrating an example of processing executed by the printing apparatus 107 in registration of a correct image. The processing illustrated in FIG. 16 is implemented by the CPU 222 in the printing apparatus 107 by deploying a program that is stored in the HDD 221 onto the memory 223 and executing the program.

In Step S1601, the printing apparatus 107 waits for a print instruction from the external controller 102 and, when a print instruction is transmitted from the external controller 102, receives the print instruction. In this step, the printing apparatus 107 determines whether the timing of reception of the print instruction from the external controller 102 is given timing. This print instruction corresponds to a print instruction transmitted from the external controller 102 to the image forming apparatus 101 in the processing of Step S1502 or Step S1504 of FIG. 15.

When it is determined in Step S1601 that a print instruction has not been received, the printing apparatus 107 continues to wait for a print instruction from the external controller 102.

When it is determined in Step S1601 that a print instruction has been received, on the other hand, the printing apparatus 107 advances the processing to Step S1602. In Step S1602, the printing apparatus 107 prints a job received from the external controller 102. The job transmitted from the external controller 102 includes information indicating a sheet feeding destination and a sheet discharge destination, in addition to image data to be printed, among others. The printing apparatus 107 controls the operation of the inserter 108, the verification apparatus 109, the stacker 110, and the finisher 111 via the communication cable 255, in a manner appropriate for the contents of the job received from the external controller 102.

The printing apparatus 107 then ends the series of processing steps illustrated in FIG. 16.

Figure 17:
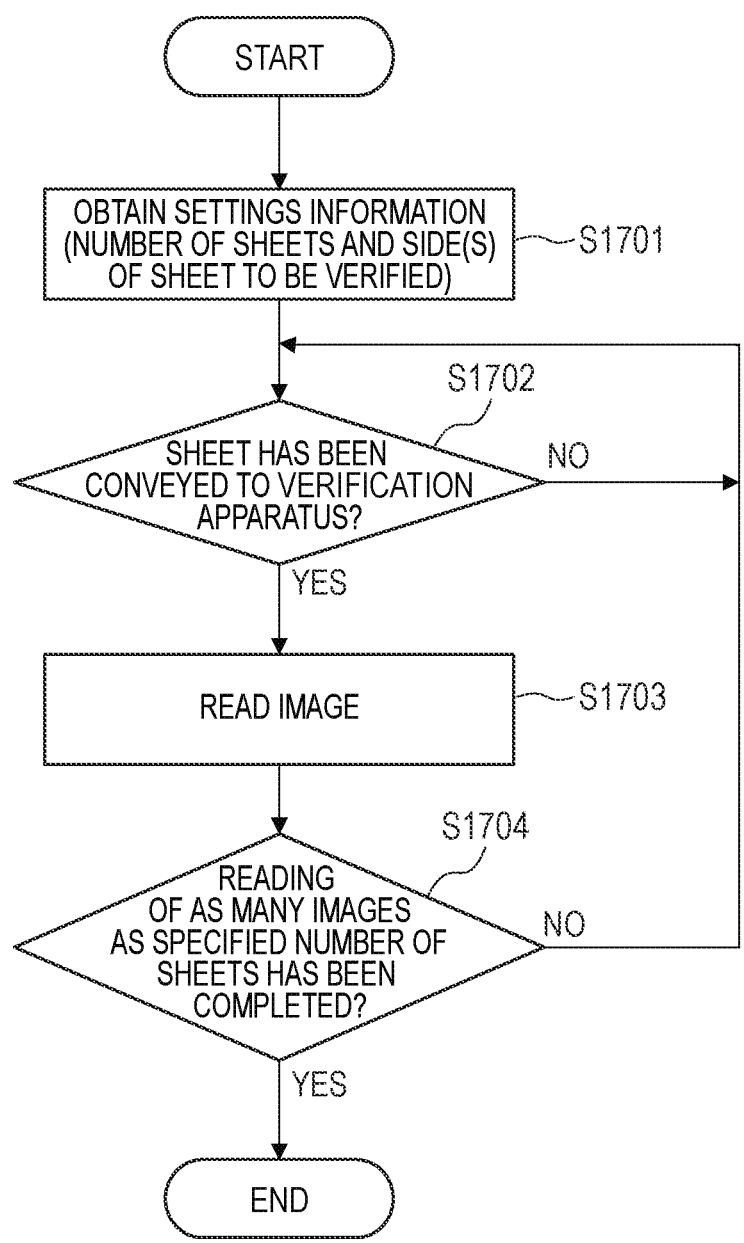
FIG. 17 is a flow chart for illustrating an example of processing of a verification apparatus.

Processing illustrated in FIG. 17 is described. FIG. 17 is a flow chart for illustrating an example of processing executed by the verification apparatus 109 in registration of a correct image. The processing illustrated in FIG. 17 is implemented by the CPU 238 in the verification apparatus 109 by deploying and executing a program that is stored in the memory 239.

In Step S1701, the verification apparatus 109 obtains settings information about verification of a printed material. The settings information obtained in Step S1701 includes, for example, information about the number of sheets per copy, a side of a sheet to be verified, and the like, which are specified through the display screen illustrated in FIG. 5A.

In Step S1702, the verification apparatus 109 waits for a sheet to be conveyed thereto. In this step, the verification apparatus 109 determines whether the timing of conveyance of a sheet from the printing apparatus 107 is given timing.

When it is determined in Step S1702 that a sheet has not been conveyed, the verification apparatus 109 continues to wait for a sheet to be conveyed from the printing apparatus 107.

When it is determined in Step S1702 that a sheet has been conveyed, on the other hand, the verification apparatus 109 advances the processing to Step S1703. In Step S1703, the verification apparatus 109 reads an image of the conveyed sheet with the use of the cameras 331 and 332, and stores the image in the memory 239. The verification apparatus 109 also displays the image stored in the memory 239 on the display area 601 of the display screen illustrated in FIG. 6A.

In Step S1704, the verification apparatus 109 determines whether as many images as the number of sheets that is specified in the settings information obtained in Step S1701 have been read.

When it is determined in Step S1704 that the reading of as many images as the specified number of sheets has not been completed, the verification apparatus 109 returns the processing to Step S1702.

When it is determined in Step S1704 that the reading of as many images as the specified number of sheets has been completed, the verification apparatus 109 ends the series of processing steps illustrated in FIG. 17.

(Processing Related to Registration of a Partition Paper Image)

Figure 18:
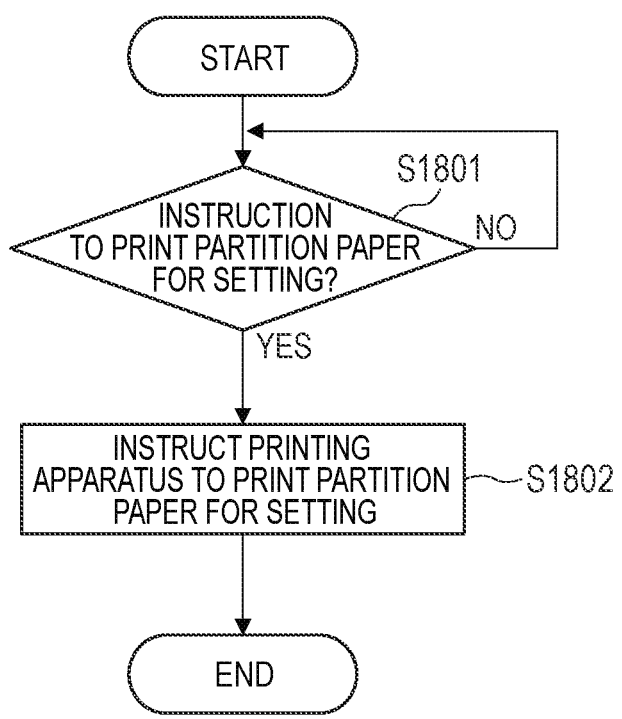
FIG. 18 is a flow chart for illustrating an example of processing of the external controller.

Processing illustrated in FIG. 18 is described. FIG. 18 is a flow chart for illustrating an example of a flow of processing executed by the external controller 102 in registration of a partition paper image. The processing illustrated in FIG. 18 is implemented by the CPU 208 in the external controller 102 by deploying a program that is stored in the HDD 210 onto the memory 209 and executing the program.

In Step S1801, the external controller 102 determines whether an instruction about printing partition paper for setting has been received. The processing of Step S1801 corresponds to, for example, determination about whether the button 1407 associated with an instruction about printing partition paper for setting has been pressed on the display screen illustrated in FIG. 14.

When it is determined in Step S1801 that an instruction about printing partition paper for setting has not been received, the external controller 102 continues to wait for an instruction about printing partition paper for setting.

When it is determined in Step S1801 that an instruction about printing partition paper for setting has been received, on the other hand, the external controller 102 advances the processing to Step S1802. In Step S1802, the external controller 102 instructs the image forming apparatus 101 to print partition paper for setting, and ends the series of processing steps illustrated in FIG. 18.

A print instruction transmitted by the external controller 102 in Step S1802 includes, for example, image data of partition paper. The image data of partition paper is created by the external controller 102 based on, for example, information about settings of partition paper that has been specified through a display screen displayed with the press of the button 1406 of FIG. 14. The image data includes, for example, an element (for example, a barcode or a QR code) by which the verification apparatus 109 determines whether a sheet conveyed thereto is partition paper, and a partition paper ID, as in the partition paper image displayed in the display area 801 of the display screen illustrated in FIG. 8.

Figure 19:
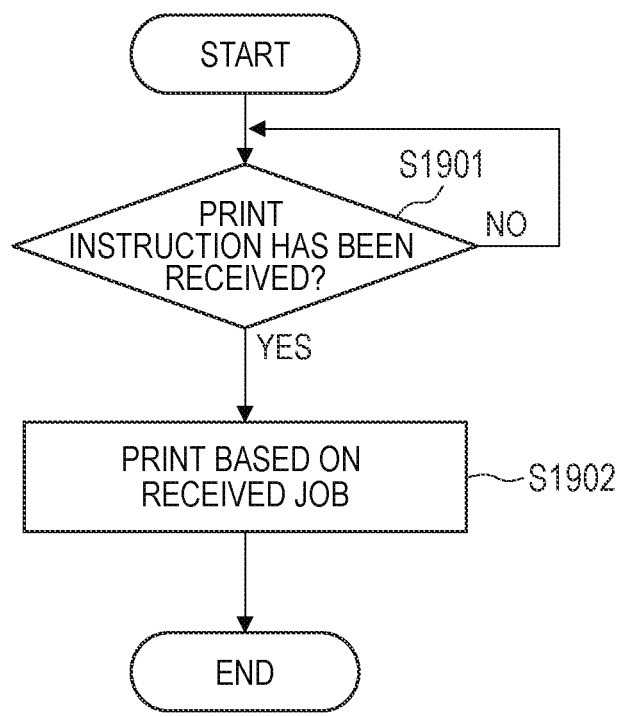
FIG. 19 is a flow chart for illustrating an example of processing of the printing apparatus.

Processing illustrated in FIG. 19 is described. FIG. 19 is a flow chart for illustrating an example of processing executed by the printing apparatus 107 in registration of a partition paper image. The processing illustrated in FIG. 19 is implemented by the CPU 222 in the printing apparatus 107 by deploying a program that is stored in the HDD 221 onto the memory 223 and executing the program.

In Step S1901, the printing apparatus 107 waits for a print instruction from the external controller 102 and, when a print instruction is transmitted from the external controller 102, receives the print instruction. In this step, the printing apparatus 107 determines whether the timing of reception of the print instruction from the external controller 102 is given timing. This print instruction corresponds to a print instruction transmitted from the external controller 102 to the image forming apparatus 101 in the processing of Step S1802 of FIG. 18.

When it is determined in Step S1901 that a print instruction has not been received, the printing apparatus 107 continues to wait for a print instruction from the external controller 102.

When it is determined in Step S1901 that a print instruction has been received, on the other hand, the printing apparatus 107 advances the processing to Step S1902. In Step S1902, the printing apparatus 107 prints a job received from the external controller 102. The printing apparatus 107 also controls the operation of the inserter 108, the verification apparatus 109, the stacker 110, and the finisher 111 via the communication cable 255, in a manner appropriate for the contents of the job received from the external controller 102.

The printing apparatus 107 then ends the series of processing steps illustrated in FIG. 19.

Figure 20:
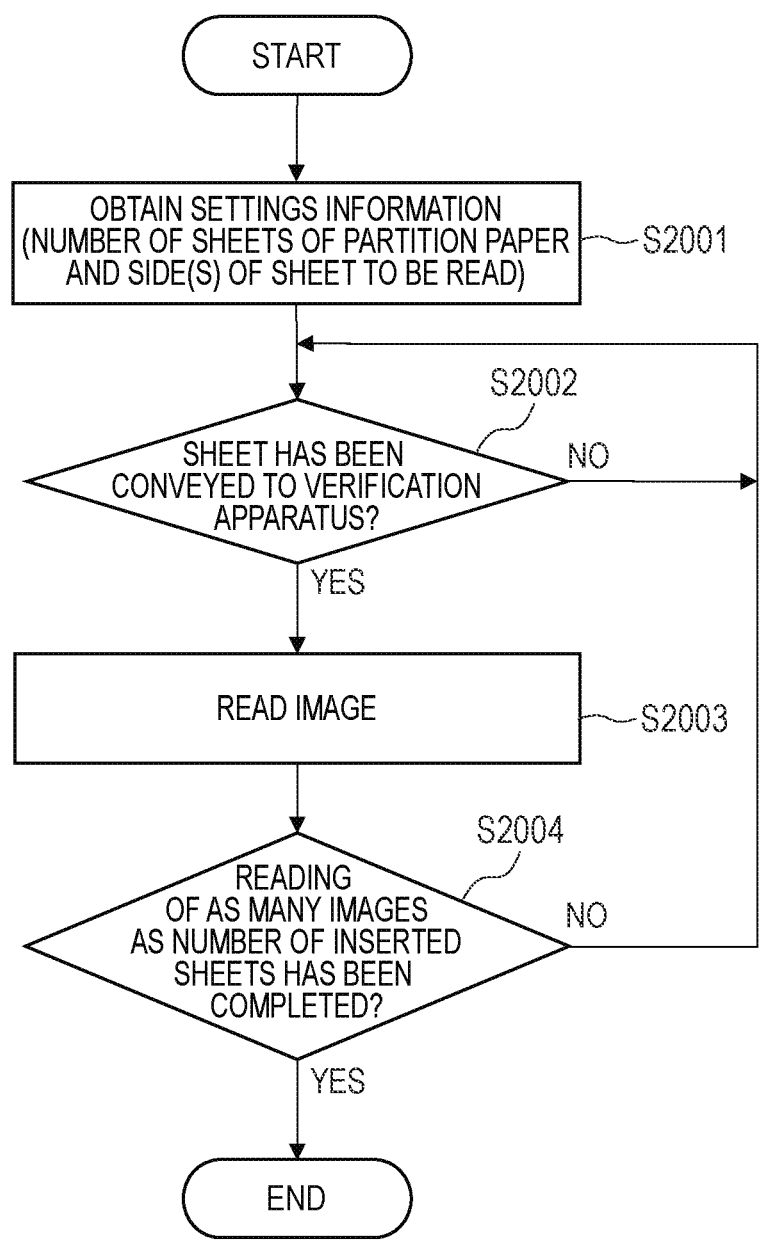
FIG. 20 is a flow chart for illustrating an example of processing of the verification apparatus.

Processing illustrated in FIG. 20 is described. FIG. 20 is a flow chart for illustrating an example of processing executed by the verification apparatus 109 in registration of a partition paper image. The processing illustrated in FIG. 20 is implemented by the CPU 238 in the verification apparatus 109 by deploying and executing a program that is stored in the memory 239.

In Step S2001, the verification apparatus 109 obtains settings information about partition paper. The settings information obtained in Step S2001 includes, for example, information about the number of sheets per copy, a side of a sheet to be verified, and the like, which are specified through the display screen illustrated in FIG. 7A.

In Step S2002, the verification apparatus 109 waits for a sheet to be conveyed thereto. In this step, the verification apparatus 109 determines whether the timing of conveyance of a sheet from the printing apparatus 107 is given timing.

When it is determined in Step S2002 that a sheet has not been conveyed, the verification apparatus 109 continues to wait for a sheet to be conveyed from the printing apparatus 107.

When it is determined in Step S2002 that a sheet has been conveyed, on the other hand, the verification apparatus 109 advances the processing to Step S2003. In Step S2003, the verification apparatus 109 reads an image of the conveyed sheet with the use of the cameras 331 and 332, and stores the image in the memory 239. The verification apparatus 109 also displays the image stored in the memory 239 on the display area 801 of the display screen illustrated in FIG. 8.

In Step S2004, the verification apparatus 109 determines whether as many images as the number of sheets of partition paper to be registered that is specified in the settings information obtained in Step S2001 have been read.

When it is determined in Step S2004 that the reading of as many images as the specified number of sheets of partition paper to be registered has not been completed, the verification apparatus 109 returns the processing to Step S2002.

When it is determined in Step S2004 that the reading of as many images as the specified number of sheets of partition paper to be registered has been completed, the verification apparatus 109 ends the series of processing steps illustrated in FIG. 20.

(Processing Related to Verification of Printed Material)

Figure 21:
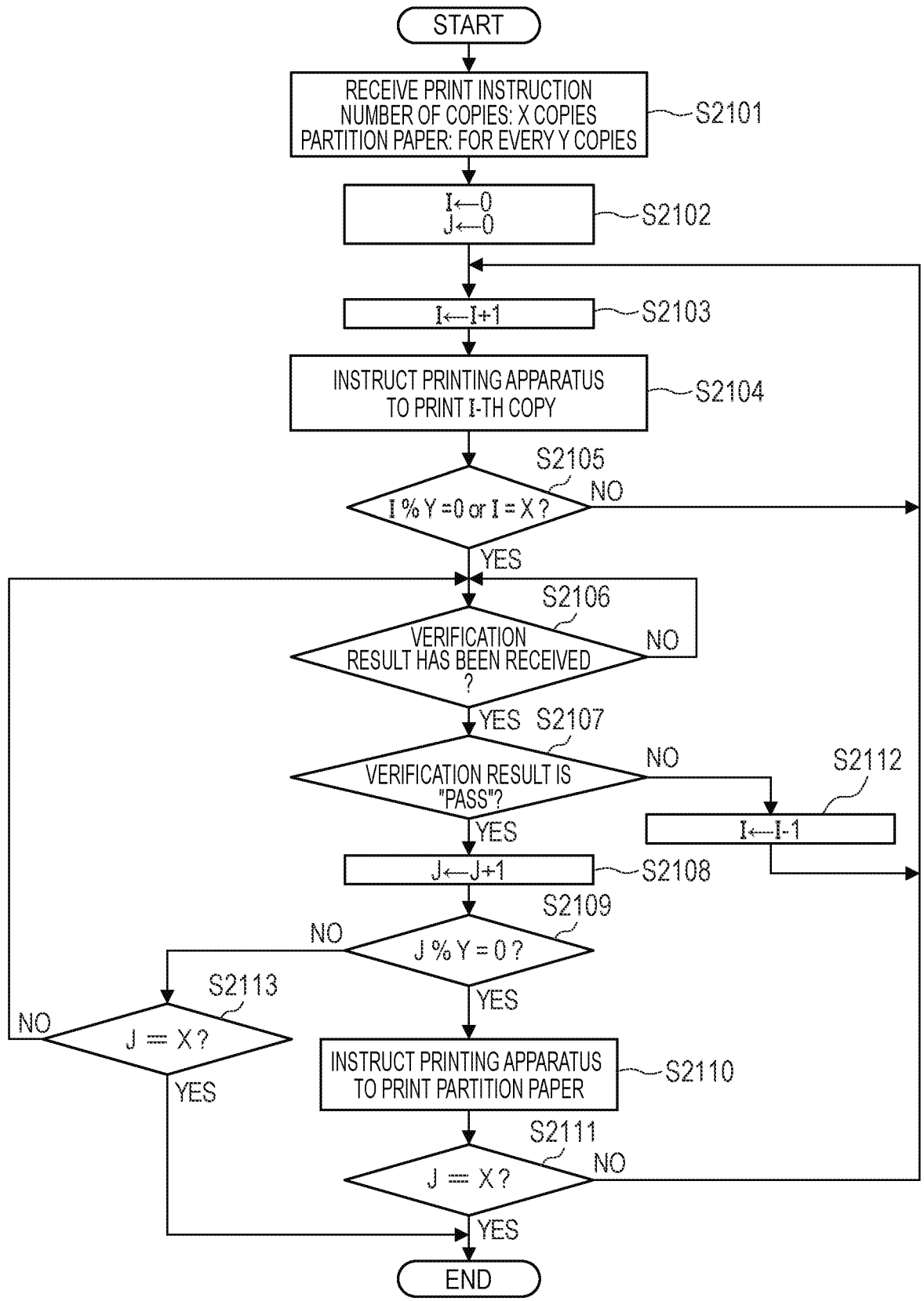
FIG. 21 is a flow chart for illustrating an example of processing of the external controller.

Processing illustrated in FIG. 21 is described. FIG. 21 is a flow chart for illustrating an example of a flow of processing executed by the external controller 102 in verification of a printed material. The processing illustrated in FIG. 21 is implemented by the CPU 208 in the external controller 102 by deploying a program that is stored in the HDD 210 onto the memory 209 and executing the program. The verification apparatus 109 starts executing the series of processing steps illustrated in FIG. 21 when detecting the press of the button 1408, which is used to receive an instruction to start printing, on the display screen illustrated in FIG. 14.

In Step S2101, when a print instruction is received from the user (when detecting the press of the button 1408 illustrated in FIG. 14), the external controller 102 obtains settings information about the number of copies of a job and the number of sheets of partition paper. The number of sheets of the job is set to a variable X. The number of sheets included in each of bundles separated from one another by partition paper is set to a variable Y. That is, in the example illustrated in FIG. 21, settings information is specified so that partition paper is inserted for each or every Y copies out of X copies of a job. An integer equal to or more than 1 is set to each of X and Y, and a relationship expressed by $X \geq Y$ is established.

In Step S2102, the external controller 102 initializes the count on a counter I and the count on a counter J to 0. The counter I indicates the number of copies of a series of printed materials, for which a print instruction has already been issued and which includes printed materials unconfirmed in terms of verification result. The counter J indicates the number of copies of printed materials determined to be normal as a result of verification.

In Step S2103, the external controller 102 increments the count on the counter I (by, for example, substituting the count on the counter I with a value "I+1").

In Step S2104, the external controller 102 instructs the printing apparatus 107 (that is, the image forming apparatus 101) to print the I-th copy.

In Step S2105, the external controller 102 determines whether the count on the counter I is divisible by the value set to the variable Y, and whether the count on the counter I is equal to the value set to the variable X.

When it is determined in Step S2105 that the count on the counter I is not divisible by the value set to the variable Y, and is not equal to the value set to the variable X, the external controller 102 returns the processing to Step S2103. In this case, the count on the counter I is incremented in Step S2103, to thereby print the next copy in Step S2104.

When it is determined in Step S2105 that the count on the counter I is divisible by the value set to the variable Y, or equal to the value set to the variable X, the external controller 102 advances the processing to Step S2106. In this case, whether the external controller 102 next issues an instruction about normal printing (printing of a printed material to be printed) or an instruction about printing of partition paper to the printing apparatus 107 is determined depending on the result of verification of a sheet on which printing is being executed.

In Step S2106, the external controller 102 therefore waits to be notified of the result of verification by the verification apparatus 109 (that is, the image forming apparatus 101). In this step, the external controller 102 determines whether the timing of verification result notification from the verification apparatus 109 is given timing. The processing of Step S2106 corresponds to an example of obtaining processing in which information based on the result of verification about whether a printed material satisfies a given condition is obtained from the verification apparatus 109.

When it is determined in Step S2106 that the verification result has not been notified from the verification apparatus 109, the external controller 102 continues to wait to be notified of the result of verification by the verification apparatus 109.

When it is determined in Step S2106 that the verification result has been notified from the verification apparatus 109, the external controller 102 advances the processing to Step S2107. In Step S2107, the external controller 102 checks whether the verification result notified from the verification apparatus 109 is "pass."

When the verification result notified from the verification apparatus 109 is confirmed to be "fail" in Step S2107, the external controller 102 advances the processing to Step S2112. In Step S2112, the external controller 102 decrements the count on the counter I (by, for example, substituting the value of the variable I with "I−1"), and returns the processing to Step S2103.

When the verification result notified from the verification apparatus 109 is confirmed to be "pass" in Step S2107, on the other hand, the external controller 102 advances the processing to Step S2108. In Step S2108, the external controller 102 increments the count on the counter J (by, for example, substituting the count on the counter J with a value "J+1").

In Step S2109, the external controller 102 determines whether the count on the counter J is divisible by the value set to the variable Y.

When it is determined in Step S2109 that the count on the counter J is not divisible by the value set to the variable Y, the external controller 102 advances the processing to Step S2113. In Step S2113, the external controller 102 determines whether the count on the counter J is equal to the value set to the variable X.

When it is determined in Step S2113 that the count on the counter J is not equal to the value set to the variable X, the external controller 102 returns the processing to Step S2106. In this case, the external controller 102 waits to be notified of the next verification result from the verification apparatus 109 in Step S2106.

When it is determined in Step S2113 that the count on the counter J is equal to the value set to the variable X, on the other hand, the external controller 102 determines that printing of the series of copies has been completed, and ends the series of processing steps illustrated in FIG. 21.

When it is determined in Step S2109 that the count on the counter J is divisible by the value set to the variable Y, the external controller 102 advances the processing to Step S2110. In Step S2110, the external controller 102 instructs the printing apparatus 107 to print partition paper.

The print instruction transmitted in Step S2110 to the printing apparatus 107 by the external controller 102 includes, for example, image data of partition paper. The image data of partition paper is created by the external controller 102 based on, for example, information about settings of partition paper that has been specified through a display screen displayed with the press of the button 1406 of FIG. 14. The image data includes, for example, an element (for example, a barcode or a QR code) by which the verification apparatus 109 determines whether a sheet conveyed thereto is partition paper, and a partition paper ID, as in the partition paper image displayed in the display area 801 of the display screen illustrated in FIG. 8. The transmitted print instruction may also include, for example, information about a job and information about the number of copies of a printed material (sheet) finished being printed.

In this embodiment, an ID different for each job and for each sheet of partition paper is set as the partition paper ID. Information based on a verification result for each sheet of partition paper (that is, a verification result for each of bundles separated from one another by partition paper) can thus be presented in the display area 1102 of the display screen illustrated in FIG. 11.

As described in the description of the processing of Step S2103 to Step S2110, Step S2112, and Step S2113, the external controller 102 instructs the printing apparatus 107 to print a printed material until the number of printed materials (sheets) determined to be a pass as a result of verification reaches the number set to the variable X. In the meantime, when a printed material determined to be a fail as a result of verification (namely, a printed material that does not satisfy a given condition) is detected, the external controller 102 newly instructs the printing apparatus 107 to print a printed material. With this configuration, the number of printed materials to be printed is controlled by newly instructing the printing apparatus 107 to print as many printed materials as the number of printed materials determined to be a fail as a result of verification.

When the number of printed materials determined to be a pass as a result of verification reaches the number set to the variable X, the external controller 102 stops instructing the printing apparatus 107 to print a printed material. This suppresses output of printed materials from the printing apparatus 107. The external controller 102 then instructs the printing apparatus 107 to print partition paper.

Through the execution of the series of processing steps described above, partition paper is output subsequently to output of a specific number of printed materials determined to be a pass as a result of verification (namely, printed materials that satisfy a given condition). That is, the processing of Step S2103 to Step S2110, Step S2112, and Step S2113 corresponds to an example of control processing in which control is performed so that output of printed materials from the printing apparatus is suppressed when the number of printed materials satisfying a given condition reaches a given number, and so that insertion paper is output next to the given number of printed materials.

In Step S2111, the external controller 102 determines whether the count on the counter J is equal to the value set to the variable X.

When it is determined in Step S2111 that the count on the counter J is not equal to the value set to the variable X, the external controller 102 returns the processing to Step S2103.

When it is determined in Step S2111 that the count on the counter J is equal to the value set to the variable X, on the other hand, the external controller 102 determines that printing of the series of copies has been completed, and ends the series of processing steps illustrated in FIG. 21.

Figure 22:
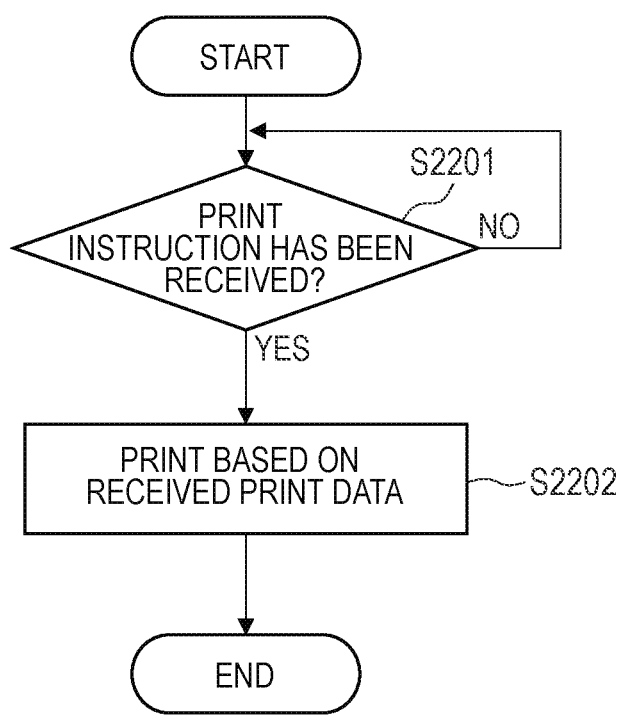
FIG. 22 is a flow chart for illustrating an example of processing of the printing apparatus.

Processing illustrated in FIG. 22 is described. FIG. 22 is a flow chart for illustrating an example of processing executed by the printing apparatus 107 in verification of a printed material. The processing illustrated in FIG. 22 is implemented by the CPU 222 in the printing apparatus 107 by deploying a program that is stored in the HDD 221 onto the memory 223 and executing the program.

In Step S2201, the printing apparatus 107 waits for a print instruction from the external controller 102 and, when a print instruction is transmitted from the external controller 102, receives the print instruction. In this step, the printing apparatus 107 determines whether the timing of reception of the print instruction from the external controller 102 is given timing. This print instruction corresponds to a print instruction transmitted from the external controller 102 to the image forming apparatus 101 in the processing of Step S2104 or Step S2110 of FIG. 21.

When it is determined in Step S2201 that a print instruction has not been received, the printing apparatus 107 continues to wait for a print instruction from the external controller 102.

When it is determined in Step S2201 that a print instruction has been received, on the other hand, the printing apparatus 107 advances the processing to Step S2202. In Step S2202, the printing apparatus 107 prints a job received from the external controller 102. The printing apparatus 107 also controls the operation of the inserter 108, the verification apparatus 109, the stacker 110, and the finisher 111 via the communication cable 255, in a manner appropriate for the contents of the job received from the external controller 102.

The printing apparatus 107 then ends the series of processing steps illustrated in FIG. 22.

Figure 23:
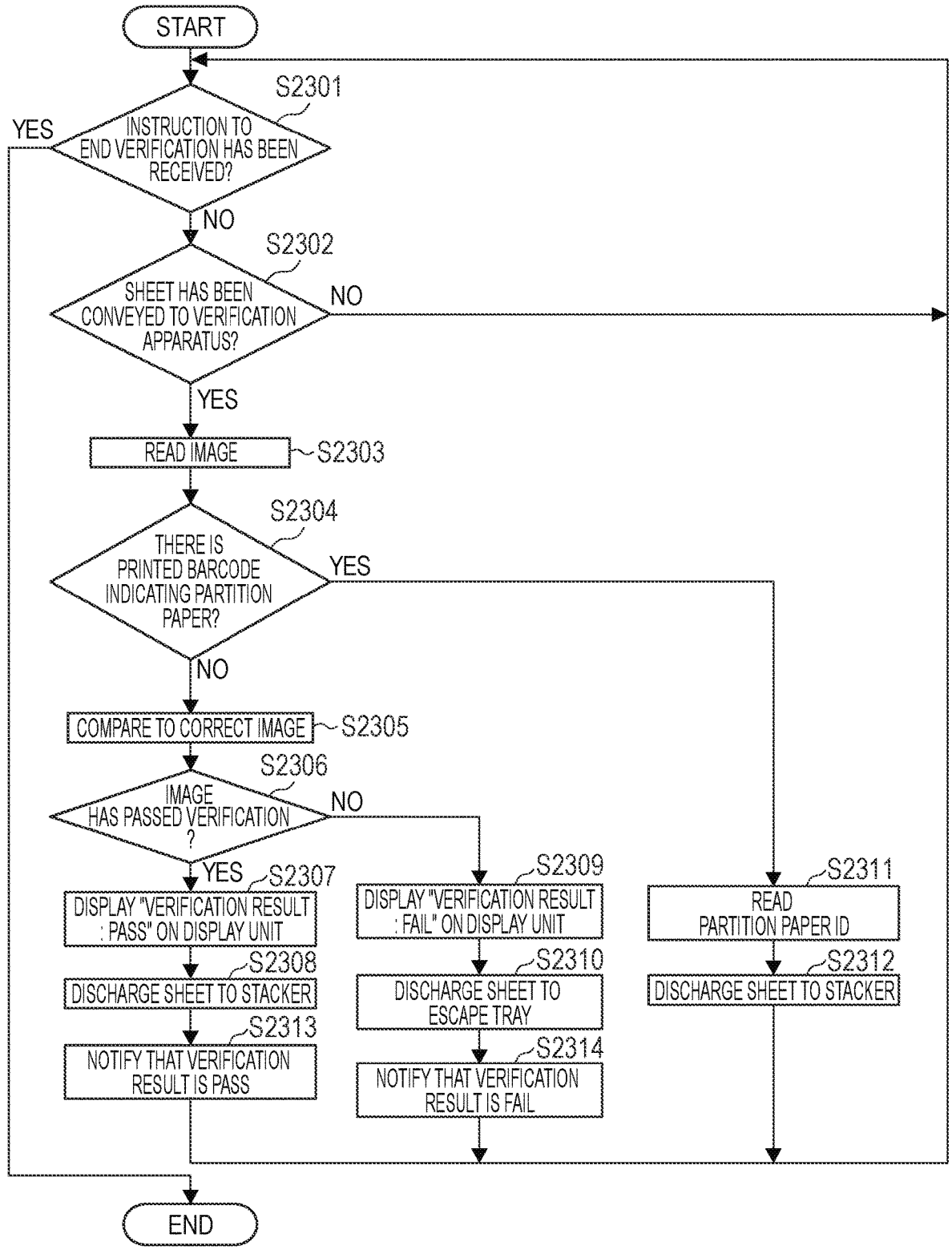
FIG. 23 is a flow chart for illustrating an example of processing of the verification apparatus.

Processing illustrated in FIG. 23 is described. FIG. 23 is a flow chart for illustrating an example of processing executed by the verification apparatus 109 in verification of a printed material. The processing illustrated in FIG. 23 is implemented by the CPU 238 in the verification apparatus 109 by deploying and executing a program that is stored in the memory 239.

In Step S2301, the verification apparatus 109 determines whether an instruction about ending verification of a printed material has been received. The processing of Step S2301 corresponds to, for example, determination about whether the button 1203 associated with an instruction about ending verification of a printed material has been pressed on the display screen illustrated in FIG. 12A.

When it is determined in Step S2301 that an instruction about ending verification of a printed material has been received, the verification apparatus 109 ends the series of processing steps illustrated in FIG. 23.

When it is determined in Step S2301 that an instruction about ending verification of a printed material has not been received, on the other hand, the verification apparatus 109 advances the processing to Step S2302. In Step S2302, the verification apparatus 109 waits for a sheet to be conveyed thereto. In this step, the verification apparatus 109 determines whether the timing of conveyance of a sheet from the printing apparatus 107 is given timing.

When it is determined in Step S2302 that a sheet has not been conveyed to the verification apparatus 109, the verification apparatus 109 returns the processing to Step S2301.

When it is determined in Step S2302 that a sheet has been conveyed to the verification apparatus 109, on the other hand, the verification apparatus 109 advances the processing to Step S2303. In Step S2303, the verification apparatus 109 reads an image of the conveyed sheet with the use of the cameras 331 and 332, and stores the image in the memory 239. The verification apparatus 109 also displays the image stored in the memory 239 in the display area 1201 of the display screen illustrated in FIG. 12A.

In Step S2304, the verification apparatus 109 determines whether a barcode indicating partition paper is printed in the image read in Step S2303. A condition for determining whether a sheet to be determined is partition paper based on an image read by the verification apparatus 109 is determined based on instructions that are received through the display screen illustrated in FIG. 9A. The condition is accordingly not limited to barcodes, and, for example, the verification apparatus 109 may determine whether a sheet to be determined is partition paper based on whether a QR code, or image data, indicating partition paper is printed in an image that is obtained by reading the sheet.

When it is determined in Step S2304 that a barcode indicating partition paper is printed in the read image, the verification apparatus 109 advances the processing to Step S2311. In Step S2311, the verification apparatus 109 reads a partition paper ID printed on the partition paper. The partition paper ID read in Step S2311 is used to, for example, display information based on partition paper-by-partition paper verification results (that is, verification results of each of the bundles separated from one another by partition paper) in the display area 1102 on the display screen illustrated in FIG. 11.

In Step S2312, the verification apparatus 109 instructs the printing apparatus 107 to deliver the target sheet (the sheet determined to be partition paper) to the sheet stacking tray 341 of the stacker 110. The verification apparatus 109 then returns the processing to Step S2301.

When it is determined in Step S2304 that a barcode indicating partition paper is not printed in the read image, on the other hand, the verification apparatus 109 advances the processing to Step S2305. In Step S2305, the verification apparatus 109 compares the image read in Step S2303 to a correct image. Items by which the images are compared in Step S2305 are determined based on a verification level that is specified in the setting area 1001 on the display screen illustrated in FIG. 10, and a verification type specified in the setting area 1002.

In Step S2306, the verification apparatus 109 determines whether the read image is a normal image (a pass in verification) or a defective image (a fail in verification), based on the result of the comparison in Step S2305.

When it is determined in Step S2306 that the read image is a normal image (a pass in verification), the verification apparatus 109 advances the processing to Step S2307. In Step S2307, the verification apparatus 109 displays information indicating that the verification result is "pass" on the display unit 241. For instance, the display screen illustrated in FIG. 12A is an example of a screen displayed on the display unit 241 in Step S2307.

In Step S2308, the verification apparatus 109 instructs the printing apparatus 107 to deliver the target sheet (the sheet determined to be a pass in verification) to the sheet stacking tray 341 of the stacker 110. The sheet discharge destination specified in Step S2308 by the verification apparatus 109 is based on a sheet discharge destination that is specified in the setting area 1403 of the display screen illustrated in FIG. 14. Following this instruction from the verification apparatus 109, the printing apparatus 107 instructs the stacker 110 to deliver the sheet conveyed thereto to the sheet stacking tray 341.

In Step S2313, the verification apparatus 109 notifies the printing apparatus 107 that the verification result is "pass." The printing apparatus 107 transmits information based on the verification result notified by the verification apparatus 109 (namely, information indicating that the verification result is "pass") to the external controller 102 via the internal LAN 105.

The verification apparatus 109 then returns the processing to Step S2301.

When it is determined in Step S2306 that the read image is a defective image (a fail in verification), the verification apparatus 109 advances the processing to Step S2309. In Step S2309, the verification apparatus 109 displays information indicating that the verification result is "fail" on the display unit 241. For instance, the display screen illustrated in FIG. 12B is an example of a screen displayed on the display unit 241 in Step S2309.

In Step S2310, the verification apparatus 109 instructs the printing apparatus 107 to deliver the target sheet (the sheet determined to be a fail in verification) to the escape tray 346 of the stacker 110. The sheet discharge destination specified in Step S2310 by the verification apparatus 109 is based on a sheet discharge destination that is specified in the setting area 1403 of the display screen illustrated in FIG. 14 to be used when a verified image is determined to be a defective image. Following this instruction from the verification apparatus 109, the printing apparatus 107 instructs the stacker 110 to deliver the sheet conveyed thereto to the escape tray 346.

In Step S2314, the verification apparatus 109 notifies the printing apparatus 107 that the verification result is "fail." The printing apparatus 107 transmits information based on the verification result notified by the verification apparatus 109 (namely, information indicating that the verification result is "fail") to the external controller 102 via the internal LAN 105.

The verification apparatus 109 then returns the processing to Step S2301.

Through the execution of the processing described above, a sheet determined to be a pass as a result of verification is delivered to the sheet stacking tray 341. Bundles of sheets delivered to the sheet stacking tray 341 (namely, sheets that are a pass in verification) are separated from one another by partition paper, which is delivered to the sheet stacking tray 341 as well. In addition, through the processing of Step S2107 and Step S2112 illustrated in FIG. 21, a bundle containing a specific number of sheets that have been determined to be normal can be created because as many sheets as the number of sheets determined to be a fail as a result of verification are printed in supplementary printing.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may include one or more processors, one or more memories, circuitry, or a combination thereof (e.g., central processing unit (CPU), micro processing unit (MPU), or the like) and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiment described above deals with an example of a case in which the specification of settings information about verification of a printed material is received from the user through a display screen (for example, the display screens illustrated in FIG. 4 to FIG. 13) displayed on the display unit 241 of the verification apparatus 109. On the other hand, a configuration and processing that are related to reception of the specification of settings information about verification of a printed material in the image forming system according to the embodiment described above is not limited to the example given above. Specifically, the specification of settings information about verification of a printed material may be received via at least one of: the external controller 102, the printing apparatus 107, the verification apparatus 109, and the terminal apparatus 103. The same applies to reception of a print instruction through a display screen (for example, the display screen illustrated in FIG. 14) displayed on the display unit 212 of the external controller 102.

According to the present disclosure, a user's difficulty related to the creation of a bundle of printed materials that is separated from another bundle of printed materials by partition paper can be reduced in a more favorable mode.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-205677, filed Nov. 13, 2019, which is hereby incorporated by reference herein in its entirety.

What is claimed is:

1. An information processing apparatus comprising:
an obtaining unit configured to obtain, from a verification apparatus configured to perform, for each printed material of printed materials, verification about whether the printed material satisfies a given condition, information that is based on a result of the verification, wherein each of the printed materials is a recording medium on which an image is printed by a printing apparatus; and
a control unit configured to perform control so that output of the printed materials from the printing apparatus is suppressed when a given number of printed materials are handled as one bundle and the number of printed materials that satisfy the given condition reaches the given number based on the verification result, and so that insertion paper interspacing a plurality of bundles is output next to the given number of printed materials that satisfy the given condition.

2. The information processing apparatus according to claim 1, wherein, after the insertion paper is output, the control unit instructs the printing apparatus to convey the printed material for a new bundle.

3. The information processing apparatus according to claim 1, wherein, when the printed material that does not satisfy the given condition is detected based on the verification result, the control unit newly instructs the printing apparatus to print the printed material.

4. The information processing apparatus according to claim 3, wherein the control unit is configured to control the number of printed materials that are newly instructed to be printed by the printing apparatus, based on the number of printed materials that do not satisfy the given condition.

5. An image forming system comprising:
- a printing apparatus configured to print an image on a recording medium to output the recording medium as one of printed materials;
- a verification apparatus configured to perform, for each printed material of the printed materials, verification about whether the printed material satisfies a given condition; and
- an information processing apparatus, wherein the information processing apparatus includes:
- an obtaining unit configured to obtain, from the verification apparatus, information that is based on a result of the verification of the printed material, and
- a control unit configured to perform control so that output of the printed materials from the printing apparatus is suppressed when a given number of printed materials are handled as one bundle and the number of printed materials that satisfy the given condition reaches the given number based on the verification result, and so that insertion paper interspacing a plurality of bundles is output next to the given number of printed materials that satisfy the given condition.

6. The image forming system according to claim 5,
wherein the control unit is configured to instruct the printing apparatus to print the insertion paper, and
wherein the verification apparatus is configured to exclude the insertion paper conveyed from the printing apparatus from printed materials to be verified.

7. The image forming system according to claim 6,
wherein, on the insertion paper, a code indicating that the printed material is the insertion paper is printed in at least a part of the insertion paper, and
wherein the verification apparatus is configured to exclude the insertion paper from the printed materials to be verified, by reading the code printed on the insertion paper and thus identifying the insertion paper.

8. A method for an information processing apparatus, the method comprising:
- obtaining, from a verification apparatus configured to perform, for each printed material of printed materials, verification about whether the printed material satisfies a given condition, information that is based on a result of the verification, wherein each of the printed materials is a recording medium on which an image is printed by a printing apparatus; and
- performing control so that output of the printed materials from the printing apparatus is suppressed when a given number of printed materials are handled as one bundle and the number of printed materials that satisfy the given condition reaches the given number based on the verification result, and so that insertion paper interspacing a plurality of bundles is output next to the given number of printed materials that satisfy the given condition.

9. The method according to claim 8, wherein, after the insertion paper is output, performing control includes instructing the printing apparatus to convey the printed material for a new bundle.

10. The method according to claim 8, wherein, when the printed material that does not satisfy the given condition is detected based on the verification result, performing control includes newly instructing the printing apparatus to print the printed material.

11. The method according to claim 10, wherein performing control includes controlling the number of printed materials that are newly instructed to be printed by the printing apparatus, based on the number of printed materials that do not satisfy the given condition.

12. A method for an image forming system having a printing apparatus configured to print an image on a recording medium to output the recording medium as one of printed materials, a verification apparatus configured to perform, for each printed material of the printed materials, verification about whether the printed material satisfies a given condition, and an information processing apparatus, the method comprising:
- obtaining, by the information processing apparatus, from the verification apparatus, information that is based on a result of the verification of the printed material, and
- performing, by the information processing apparatus, control so that output of the printed materials from the printing apparatus is suppressed when a given number of printed materials are handled as one bundle and the number of printed materials that satisfy the given condition reaches the given number based on the verification result, and so that insertion paper interspacing a plurality of bundles is output next to the given number of printed materials that satisfy the given condition.

13. The method according to claim 12, wherein performing control includes instructing the printing apparatus to print the insertion paper, the method further comprising excluding, by the verification apparatus, the insertion paper conveyed from the printing apparatus from printed materials to be verified.

14. The method according to claim 13, further comprising printing, on the insertion paper by the printing apparatus, a code indicating that the printed material is the insertion paper is printed in at least a part of the insertion paper,
wherein excluding includes excluding, by the verification apparatus, the insertion paper from the printed materials to be verified, by reading the code printed on the insertion paper and thus identifying the insertion paper.

15. A non-transitory computer-readable storage medium storing a program to cause a computer to perform a method for an information processing apparatus, the method comprising:
- obtaining, from a verification apparatus configured to perform, for each printed material of printed materials, verification about whether the printed material satisfies a given condition, information that is based on a result of the verification, wherein each of the printed materials is a recording medium on which an image is printed by a printing apparatus; and
- performing control so that output of the printed materials from the printing apparatus is suppressed when a given number of printed materials are handled as one bundle and the number of printed materials that satisfy the given condition reaches the given number based on the verification result, and so that insertion paper interspacing a plurality of bundles is output next to the given number of printed materials that satisfy the given condition.

* * * * *